(12) United States Patent
Rosenberg et al.

(10) Patent No.: US 11,769,164 B2
(45) Date of Patent: *Sep. 26, 2023

(54) INTERACTIVE BEHAVIORAL POLLING FOR AMPLIFIED GROUP INTELLIGENCE

(71) Applicant: Unanimous A. I., Inc., Arlington, VA (US)

(72) Inventors: Louis B. Rosenberg, San Luis Obispo, CA (US); Gregg Willcox, Seattle, WA (US)

(73) Assignee: Unanimous A. I., Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,769

(22) Filed: Jan. 21, 2022

(65) Prior Publication Data

US 2022/0147239 A1 May 12, 2022

Related U.S. Application Data

(63) Continuation of application No. 16/154,613, filed on Oct. 8, 2018, now Pat. No. 11,269,502, which is a
(Continued)

(51) Int. Cl.
*G06Q 30/0203* (2023.01)
*G06F 3/04812* (2022.01)
(Continued)

(52) U.S. Cl.
CPC ..... *G06Q 30/0203* (2013.01); *G06F 3/04812* (2013.01); *G06F 3/04842* (2013.01);
(Continued)

(58) Field of Classification Search
CPC ............. G06F 3/04847; G06F 3/04812; G06F 3/04842; G06F 3/04883; H04L 67/14;
(Continued)

(56) References Cited

U.S. PATENT DOCUMENTS 5,236,199 A 8/1993 Thompson, Jr.
5,400,248 A 3/1995 Chisholm
(Continued)

FOREIGN PATENT DOCUMENTS

CA 2414397 8/2003
EP 3123442 2/2017
(Continued)

OTHER PUBLICATIONS

"Dialogr—Asimple tool for collective thinking"; Mar. 25, 2015; http://www.dialogr.com./; 1 page.
(Continued)

*Primary Examiner* — Nicholas Ulrich
(74) *Attorney, Agent, or Firm* — Fitch, Even, Tabin & Flannery LLP

(57) ABSTRACT

Systems and methods for amplifying the accuracy of group forecasts and insights through interactive behavioral polling with perturbation analysis. During a first time period the system collects behavioral data of the user interaction with the dynamic user interface and a first displayed prompt, and then performs a perturbation analysis using the data collected during the first time period. A perturbation stimulus is displayed to the user, and during a second time period the user may additionally interact with the dynamic interface during a second time period, during which the system collects behavioral data of the user interaction during the second time period. The system determines a prediction based on data collected during at least one of the time periods from each of a plurality of users.

9 Claims, 7 Drawing Sheets

Related U.S. Application Data continuation-in-part of application No. 16/059,698, filed on Aug. 9, 2018, now Pat. No. 11,151,460, which is a continuation-in-part of application No. 15/922,453, filed on Mar. 15, 2018, now abandoned, which is a continuation-in-part of application No. 15/904,239, filed on Feb. 23, 2018, now Pat. No. 10,416,666, which is a continuation-in-part of application No. 15/898,468, filed on Feb. 17, 2018, now Pat. No. 10,712,929, which is a continuation-in-part of application No. 15/815,579, filed on Nov. 16, 2017, now Pat. No. 10,439,836, which is a continuation-in-part of application No. 15/640,145, filed on Jun. 30, 2017, now Pat. No. 10,353,551, which is a continuation-in-part of application No. 15/241,340, filed on Aug. 19, 2016, now Pat. No. 10,222,961, which is a continuation-in-part of application No. 15/199,990, filed on Jul. 1, 2016, now abandoned, which is a continuation-in-part of application No. 15/086,034, filed on Mar. 30, 2016, now Pat. No. 10,310,802, which is a continuation-in-part of application No. 15/052,876, filed on Feb. 25, 2016, now Pat. No. 10,110,664, which is a continuation-in-part of application No. 15/047,522, filed on Feb. 18, 2016, now Pat. No. 10,133,460, which is a continuation-in-part of application No. 15/017,424, filed on Feb. 5, 2016, now abandoned, which is a continuation-in-part of application No. 14/925,837, filed on Oct. 28, 2015, now Pat. No. 10,551,999, which is a continuation-in-part of application No. 14/920,819, filed on Oct. 22, 2015, now Pat. No. 10,277,645, which is a continuation-in-part of application No. 14/859,035, filed on Sep. 18, 2015, now Pat. No. 10,122,775, which is a continuation-in-part of application No. 14/738,768, filed on Jun. 12, 2015, now Pat. No. 9,940,006, which is a continuation-in-part of application No. 14/708,038, filed on May 8, 2015, now abandoned, which is a continuation-in-part of application No. 14/668,970, filed on Mar. 25, 2015, now Pat. No. 9,959,028.

(60) Provisional application No. 62/569,909, filed on Oct. 9, 2017, provisional application No. 62/552,968, filed on Aug. 31, 2017, provisional application No. 62/544,861, filed on Aug. 13, 2017, provisional application No. 62/473,424, filed on Mar. 19, 2017, provisional application No. 62/473,442, filed on Mar. 19, 2017, provisional application No. 62/473,429, filed on Mar. 19, 2017, provisional application No. 62/463,657, filed on Feb. 26, 2017, provisional application No. 62/460,861, filed on Feb. 19, 2017, provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
G06F 3/04847 (2022.01)
G06F 3/04842 (2022.01)
G06F 3/04883 (2022.01)
G06Q 10/101 (2023.01)
H04L 67/306 (2022.01)
G06N 20/00 (2019.01)
H04L 67/50 (2022.01)
H04L 67/14 (2022.01)

(52) U.S. Cl.
CPC ...... G06F 3/04847 (2013.01); G06F 3/04883 (2013.01); G06N 20/00 (2019.01); G06Q 10/101 (2013.01); H04L 67/306 (2013.01); H04L 67/535 (2022.05); H04L 67/14 (2013.01)

(58) Field of Classification Search
CPC ..... H04L 67/306; H04L 67/535; G06N 20/00; G06N 3/006; G06Q 10/101; G06Q 30/0203
See application file for complete search history.

(56) References Cited

U.S. PATENT DOCUMENTS

| | | |
|---|---|---|
| 5,808,908 A | 9/1998 | Ghahramani |
| 5,867,799 A | 2/1999 | Lang |
| 6,064,978 A | 5/2000 | Gardner |
| 6,480,210 B1 | 11/2002 | Martino |
| 6,792,399 B1 | 9/2004 | Phillips |
| 6,903,723 B1 | 6/2005 | Forest |
| 6,944,596 B1 | 9/2005 | Gray |
| 7,031,842 B1 | 4/2006 | Musat |
| 7,155,510 B1 | 12/2006 | Kaplan |
| 7,158,112 B2 | 1/2007 | Rosenberg |
| 7,451,213 B2 | 11/2008 | Kaplan |
| 7,489,979 B2 | 2/2009 | Rosenberg |
| 7,542,816 B2 | 6/2009 | Rosenberg |
| 7,562,117 B2 | 7/2009 | Rosenberg |
| 7,603,414 B2 | 10/2009 | Rosenberg |
| 7,624,077 B2 | 11/2009 | Bonabeau |
| 7,831,928 B1 | 11/2010 | Rose |
| 7,856,602 B2 | 12/2010 | Armstrong |
| 7,917,148 B2 | 3/2011 | Rosenberg |
| 7,937,285 B2 | 5/2011 | Goldberg |
| 8,176,101 B2 | 5/2012 | Rosenberg |
| 8,209,250 B2 | 6/2012 | Bradway |
| 8,250,071 B1 | 8/2012 | Killalea |
| 8,255,393 B1 | 8/2012 | Yu |
| 8,341,065 B2 | 12/2012 | Berg |
| 8,527,523 B1 | 9/2013 | Ravid |
| 8,583,470 B1 | 11/2013 | Fine |
| 8,589,488 B2 | 11/2013 | Huston |
| 8,655,804 B2 | 2/2014 | Carrabis |
| 8,660,972 B1 | 2/2014 | Heidenreich |
| 8,676,735 B1 | 3/2014 | Heidenreich |
| 8,706,742 B1 | 4/2014 | Ravid |
| 8,745,104 B1 | 6/2014 | Rosenberg |
| 8,762,435 B1 | 6/2014 | Rosenberg |
| 9,483,161 B2 | 11/2016 | Wenger |
| 9,710,836 B1 | 7/2017 | O'Malley |
| 9,940,006 B2 | 4/2018 | Rosenberg |
| 9,959,028 B2 | 5/2018 | Rosenberg |
| 10,110,664 B2 | 10/2018 | Rosenberg |
| 10,122,775 B2 | 11/2018 | Rosenberg |
| 10,133,460 B2 | 11/2018 | Rosenberg |
| 10,222,961 B2 | 3/2019 | Rosenberg |
| 10,277,645 B2 | 4/2019 | Rosenberg |
| 10,310,802 B2 | 6/2019 | Rosenberg |
| 10,332,412 B2 | 6/2019 | Swank |

(56) References Cited

U.S. PATENT DOCUMENTS

| | | |
|---|---|---|
| 10,353,551 B2 | 7/2019 | Rosenberg |
| 10,416,666 B2 | 9/2019 | Rosenberg |
| 10,439,836 B2 | 10/2019 | Rosenberg |
| 10,551,999 B2 | 2/2020 | Rosenberg |
| 10,599,315 B2 | 3/2020 | Rosenberg |
| 10,606,463 B2 | 3/2020 | Rosenberg |
| 10,606,464 B2 | 3/2020 | Rosenberg |
| 10,609,124 B2 | 3/2020 | Rosenberg |
| 10,656,807 B2 | 5/2020 | Rosenberg |
| 10,712,929 B2 | 7/2020 | Rosenberg |
| 10,817,158 B2 | 10/2020 | Rosenberg |
| 10,817,159 B2 | 10/2020 | Willcox |
| 10,992,700 B2 | 4/2021 | Stolarz |
| 11,151,460 B2 | 10/2021 | Rosenberg |
| 11,269,502 B2 | 3/2022 | Rosenberg |
| 11,360,655 B2 | 6/2022 | Willcox |
| 11,360,656 B2 | 6/2022 | Rosenberg |
| 11,636,351 B2 | 4/2023 | Rosenberg |
| 2001/0042010 A1 | 11/2001 | Hassell |
| 2002/0042920 A1 | 4/2002 | Thomas |
| 2002/0107726 A1 | 8/2002 | Torrance |
| 2002/0129106 A1 | 9/2002 | Gutfreund |
| 2002/0171690 A1 | 11/2002 | Fox |
| 2003/0023685 A1 | 1/2003 | Cousins |
| 2003/0033193 A1 | 2/2003 | Holloway |
| 2003/0065604 A1 | 4/2003 | Gatto |
| 2003/0079218 A1 | 4/2003 | Goldberg |
| 2003/0088458 A1 | 5/2003 | Afeyan |
| 2003/0210227 A1 | 11/2003 | Smith |
| 2003/0227479 A1 | 12/2003 | Mizrahi |
| 2004/0015429 A1 | 1/2004 | Tighe |
| 2004/0210550 A1 | 10/2004 | Williams |
| 2005/0067493 A1 | 3/2005 | Urken |
| 2005/0075919 A1 | 4/2005 | Kim |
| 2005/0168489 A1 | 8/2005 | Ausbeck |
| 2005/0218601 A1 | 10/2005 | Capellan |
| 2005/0261953 A1 | 11/2005 | Malek |
| 2006/0010057 A1 | 1/2006 | Bradway |
| 2006/0147890 A1 | 7/2006 | Bradford |
| 2006/0200401 A1 | 9/2006 | Lisani |
| 2006/0204945 A1 | 9/2006 | Masuichi |
| 2006/0218179 A1 | 9/2006 | Gardner |
| 2006/0250357 A1 | 11/2006 | Safai |
| 2007/0011073 A1 | 1/2007 | Gardner |
| 2007/0039031 A1 | 2/2007 | Cansler |
| 2007/0055610 A1 | 3/2007 | Palestrant |
| 2007/0067211 A1 | 3/2007 | Kaplan |
| 2007/0072156 A1 | 3/2007 | Kaufman |
| 2007/0078977 A1 | 4/2007 | Kaplan |
| 2007/0097150 A1 | 5/2007 | Ivashin |
| 2007/0099162 A1 | 5/2007 | Sekhar |
| 2007/0121843 A1 | 5/2007 | Atazky |
| 2007/0124503 A1 | 5/2007 | Ramos |
| 2007/0207479 A1 | 9/2007 | Wong |
| 2007/0208727 A1 | 9/2007 | Saklikar |
| 2007/0209069 A1 | 9/2007 | Saklikar |
| 2007/0211050 A1 | 9/2007 | Ohta |
| 2007/0216712 A1 | 9/2007 | Louch |
| 2007/0220100 A1 | 9/2007 | Rosenberg |
| 2007/0226296 A1 | 9/2007 | Lowrance |
| 2007/0294067 A1 | 12/2007 | West |
| 2008/0003559 A1 | 1/2008 | Toyama |
| 2008/0015115 A1 | 1/2008 | Guyot-Sionnest |
| 2008/0016463 A1 | 1/2008 | Marsden |
| 2008/0091777 A1 | 4/2008 | Carlos |
| 2008/0103877 A1 | 5/2008 | Gerken |
| 2008/0140477 A1 | 6/2008 | Tevanian |
| 2008/0140688 A1 | 6/2008 | Clayton |
| 2008/0189634 A1 | 8/2008 | Tevanian |
| 2008/0195459 A1 | 8/2008 | Stinski |
| 2009/0037355 A1 | 2/2009 | Brave |
| 2009/0063379 A1 | 3/2009 | Kelly |
| 2009/0063463 A1 | 3/2009 | Turner |
| 2009/0063991 A1 | 3/2009 | Baron |
| 2009/0063995 A1 | 3/2009 | Baron |
| 2009/0073174 A1 | 3/2009 | Berg |
| 2009/0076939 A1 | 3/2009 | Berg |
| 2009/0076974 A1 | 3/2009 | Berg |
| 2009/0125821 A1 | 5/2009 | Johnson |
| 2009/0239205 A1 | 9/2009 | Morgia |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0083109 A1* | 4/2010 | Tse ................. A63F 13/2145 |
| | | 715/755 |
| 2010/0100204 A1 | 4/2010 | Ng |
| 2010/0144426 A1 | 6/2010 | Winner |
| 2010/0145715 A1 | 6/2010 | Cohen |
| 2010/0169144 A1 | 7/2010 | Estill |
| 2010/0174579 A1 | 7/2010 | Hughes |
| 2010/0199191 A1 | 8/2010 | Takahashi |
| 2010/0205541 A1 | 8/2010 | Rapaport |
| 2010/0299616 A1 | 11/2010 | Chen |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208328 A1 | 8/2011 | Cairns |
| 2011/0208684 A1 | 8/2011 | Dube |
| 2011/0208822 A1 | 8/2011 | Rathod |
| 2011/0276396 A1 | 11/2011 | Rathod |
| 2011/0288919 A1 | 11/2011 | Gross |
| 2011/0320536 A1 | 12/2011 | Lobb |
| 2012/0005131 A1 | 1/2012 | Horvitz |
| 2012/0011006 A1 | 1/2012 | Schultz |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1 | 4/2012 | Considine |
| 2012/0101933 A1 | 4/2012 | Hanson |
| 2012/0109883 A1 | 5/2012 | Iordanov |
| 2012/0110087 A1 | 5/2012 | Culver |
| 2012/0179567 A1 | 7/2012 | Soroca |
| 2012/0191774 A1 | 7/2012 | Bhaskaran |
| 2012/0290950 A1 | 11/2012 | Rapaport |
| 2012/0316962 A1 | 12/2012 | Rathod |
| 2013/0013248 A1 | 1/2013 | Brugler |
| 2013/0019205 A1 | 1/2013 | Gil |
| 2013/0035989 A1 | 2/2013 | Brown |
| 2013/0041720 A1 | 2/2013 | Spires |
| 2013/0097245 A1 | 4/2013 | Adarraga |
| 2013/0103692 A1 | 4/2013 | Raza |
| 2013/0132284 A1 | 5/2013 | Convertino |
| 2013/0150253 A1 | 6/2013 | Deciu |
| 2013/0160142 A1 | 6/2013 | Lai |
| 2013/0171594 A1 | 7/2013 | Gorman |
| 2013/0184039 A1 | 7/2013 | Steir |
| 2013/0191181 A1 | 7/2013 | Balestrieri |
| 2013/0191390 A1 | 7/2013 | Engel |
| 2013/0203506 A1 | 8/2013 | Brown |
| 2013/0231595 A1 | 9/2013 | Zoss |
| 2013/0254146 A1 | 9/2013 | Ellis |
| 2013/0298690 A1 | 11/2013 | Bond |
| 2013/0300740 A1 | 11/2013 | Snyder |
| 2013/0310260 A1 | 11/2013 | Kim |
| 2013/0311904 A1 | 11/2013 | Tien |
| 2013/0339445 A1 | 12/2013 | Perincherry |
| 2014/0006042 A1 | 1/2014 | Keefe |
| 2014/0012780 A1 | 1/2014 | Sanders |
| 2014/0047356 A1 | 2/2014 | Ameller-Van-Baumberghen |
| 2014/0057240 A1 | 2/2014 | Colby |
| 2014/0074751 A1 | 3/2014 | Rocklitz |
| 2014/0075004 A1 | 3/2014 | Van Dusen |
| 2014/0089233 A1 | 3/2014 | Ellis |
| 2014/0089521 A1 | 3/2014 | Horowitz |
| 2014/0100924 A1 | 4/2014 | Ingenito |
| 2014/0108915 A1 | 4/2014 | Lu |
| 2014/0128162 A1 | 5/2014 | Arafat |
| 2014/0129946 A1 | 5/2014 | Harris |

(56) References Cited

U.S. PATENT DOCUMENTS

| | | |
|---|---|---|
| 2014/0162241 A1 | 6/2014 | Morgia |
| 2014/0171039 A1 | 6/2014 | Bjontegard |
| 2014/0214831 A1 | 7/2014 | Chi |
| 2014/0249689 A1 | 9/2014 | Bienkowski |
| 2014/0249889 A1 | 9/2014 | Park |
| 2014/0258970 A1 | 9/2014 | Brown |
| 2014/0278835 A1 | 9/2014 | Moseson |
| 2014/0279625 A1 | 9/2014 | Carter |
| 2014/0282586 A1 | 9/2014 | Shear |
| 2014/0310607 A1 | 10/2014 | Abraham |
| 2014/0316616 A1 | 10/2014 | Kugelmass |
| 2014/0337097 A1 | 11/2014 | Farlie |
| 2014/0351719 A1 | 11/2014 | Cattermole |
| 2014/0358825 A1 | 12/2014 | Phillipps |
| 2014/0379439 A1 | 12/2014 | Sekhar |
| 2015/0006492 A1 | 1/2015 | Wexler |
| 2015/0065214 A1 | 3/2015 | Olson |
| 2015/0089399 A1 | 3/2015 | Megill |
| 2015/0120619 A1 | 4/2015 | Baughman |
| 2015/0149932 A1 | 5/2015 | Yamada |
| 2015/0154557 A1 | 6/2015 | Skaaksrud |
| 2015/0156233 A1 | 6/2015 | Bergo |
| 2015/0170050 A1 | 6/2015 | Price |
| 2015/0192437 A1 | 7/2015 | Bouzas |
| 2015/0236866 A1 | 8/2015 | Colby |
| 2015/0242755 A1 | 8/2015 | Gross |
| 2015/0242972 A1 | 8/2015 | Lemmey |
| 2015/0248817 A1 | 9/2015 | Steir |
| 2015/0262208 A1 | 9/2015 | Bjontegard |
| 2015/0302308 A1 | 10/2015 | Bartek |
| 2015/0302309 A1* | 10/2015 | Bartek ............... H04L 67/10 706/11 |
| 2015/0310687 A1 | 10/2015 | Morgia |
| 2015/0326625 A1 | 11/2015 | Rosenberg |
| 2015/0331601 A1 | 11/2015 | Rosenberg |
| 2015/0339020 A1 | 11/2015 | Brandon |
| 2015/0347903 A1 | 12/2015 | Saxena |
| 2016/0034305 A1 | 2/2016 | Shear |
| 2016/0044073 A1 | 2/2016 | Rosenberg |
| 2016/0048274 A1 | 2/2016 | Rosenberg |
| 2016/0055236 A1 | 2/2016 | Frank |
| 2016/0057182 A1 | 2/2016 | Rosenberg |
| 2016/0062735 A1 | 3/2016 | Wilber |
| 2016/0078458 A1 | 3/2016 | Gold |
| 2016/0082348 A1 | 3/2016 | Kehoe |
| 2016/0092989 A1 | 3/2016 | Marsh |
| 2016/0098778 A1 | 4/2016 | Blumenthal |
| 2016/0154570 A1 | 6/2016 | Rosenberg |
| 2016/0170594 A1 | 6/2016 | Rosenberg |
| 2016/0170616 A1 | 6/2016 | Rosenberg |
| 2016/0189025 A1 | 6/2016 | Hayes |
| 2016/0209992 A1 | 7/2016 | Rosenberg |
| 2016/0210602 A1 | 7/2016 | Siddique |
| 2016/0274779 A9 | 9/2016 | Rosenberg |
| 2016/0277457 A9 | 9/2016 | Rosenberg |
| 2016/0284172 A1 | 9/2016 | Weast |
| 2016/0314527 A1 | 10/2016 | Rosenberg |
| 2016/0320956 A9 | 11/2016 | Rosenberg |
| 2016/0335647 A1 | 11/2016 | Rebrovick |
| 2016/0349976 A1 | 12/2016 | Lauer |
| 2016/0357418 A1 | 12/2016 | Rosenberg |
| 2016/0366200 A1 | 12/2016 | Healy |
| 2017/0083974 A1 | 3/2017 | Guillen |
| 2017/0091633 A1 | 3/2017 | Vemula |
| 2017/0223411 A1 | 8/2017 | De Juan |
| 2017/0300198 A1 | 10/2017 | Rosenberg |
| 2018/0076968 A1 | 3/2018 | Rosenberg |
| 2018/0181117 A1 | 6/2018 | Rosenberg |
| 2018/0196593 A1 | 7/2018 | Rosenberg |
| 2018/0203580 A1 | 7/2018 | Rosenberg |
| 2018/0204184 A1 | 7/2018 | Rosenberg |
| 2018/0217745 A1 | 8/2018 | Rosenberg |
| 2018/0239523 A1 | 8/2018 | Rosenberg |
| 2018/0373991 A1 | 12/2018 | Rosenberg |
| 2018/0375676 A1 | 12/2018 | Bader-Natal |
| 2019/0006048 A1 | 1/2019 | Gupta |
| 2019/0014170 A1 | 1/2019 | Rosenberg |
| 2019/0034063 A1 | 1/2019 | Rosenberg |
| 2019/0042081 A1 | 2/2019 | Rosenberg |
| 2019/0066133 A1 | 2/2019 | Cotton |
| 2019/0121529 A1 | 4/2019 | Rosenberg |
| 2019/0212908 A1 | 7/2019 | Willcox |
| 2020/0005341 A1 | 1/2020 | Marsh |
| 2020/0019893 A1 | 1/2020 | Lu |
| 2020/0250380 A1 | 8/2020 | Wang |
| 2021/0004149 A1 | 1/2021 | Willcox |
| 2021/0004150 A1 | 1/2021 | Rosenberg |
| 2021/0209554 A1 | 7/2021 | Hill |
| 2021/0241127 A1 | 8/2021 | Rosenberg |
| 2022/0276774 A1 | 9/2022 | Rosenberg |
| 2022/0276775 A1 | 9/2022 | Willcox |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Atanasov et al; "Distilling the Visdom of Crowds: Prediction Markets vs. Prediction Polls"; Managament Science, Articles in Advance; pp. 1-16; http://dx.doi.org/10.1287/mnsc.2015.2374; 2016 INFORMS (Year 2016).

Beni; "From Swarm Intelligence to Swarm Robotics"; Swarm Robotics WS 2004, LNCS 3342; pp.1-9; 2005.

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Cuthbertson; "Oscar Predictions: AI Calculates Leonardo DiCaprio VWI Finally Get His Oscar"; Newsweek Tech & Science; http://www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al; "Prediction Markets in the Laboratory"; University of Arkansas and Chapman University; J. Econ. Surv., 2013; 33 pages.

Deneubourg et al; "Collective Patterns and Decision-Making"; Ethology Ecology & Evolution; Mar. 22, 1989; pp. 295-311

Ding et al; "Time Weight Collaborative Filtering"; CIKM'05, Oct. 31-Nov. 5, 2005; Bremen, Germany; pp. 485-492.

EP; Extended European Search Report for EP Application No. 157679093 mailed from the European Patent Office dated Sep. 4, 2017.

EP; Extended European Search Report for EP Application No. 158089821 mailed from the European Patent Office dated Nov. 28, 2017.

EP; Extended European Search Report for EP Application No. 158524959 mailed from the European Patent Office dated Mar. 21, 2018.

Examination Report for Indian Patent Application No. 201747000968 mailed from the Indian Patent Office dated Nov. 4, 2020.

Examination Report under Section 18(3) for GB1805236.5 mailed from the Intellectual Property Office dated Jul. 30, 2021.

(56) References Cited

OTHER PUBLICATIONS

Examination Report under Section 18(3) for GB1805236.5 mailed from the Intellectual Property Office dated Apr. 1, 2021.
Gauchou et al; "Expression of Nonconscious Knowledge via Ideomotor Actions"; Consciousness ant Cognition; Jul. 28, 2011; 9 pages.
Green; "Testing and Quantifying Collective Intelligence"; Collective Intelligence 2015; May 31, 2015; 4 pages.
Gurcay et al.; "The Power of Social Influence on Estimation Accuracy"; Journal of Behavioral Decision Making; J. Behav. Dec. Making (2014); Published online in Wiley Online Library (wileyonlinelibrary.com); DOI:10.1002/bdm.1843; 12 pages (Year: 2014).
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science ofthe Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion ofthe International Searching Authority for PCT/US2015/022594 dated Jun. 29,2015.
Malone et al; "Harnessing Crowds: Mapping the Genome of Collective Intelligence"; MIT Center for Collective Intelligence; Feb. 2009; 20 pages.
Mathematics Libre Texts; "3.3: Power Functions and Polynomial Functions"; Accessed on Oct. 8, 2021 at https://math.libretexts.org/Bookshelves/Precalculus/Precalculus_(OpenStax)/03%3A_Polynomial_and_Rational_Funotions/3.03%3A_Power_Functions_and_Polynomial_Functions (Year:2021); 12 pages.
Meyer; "Meet Loomio, The Small-Scale Decision-Making Platform With The Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Puleston et al.; "Predicting the Future: Primary Research Exploring the Science of Prediction"; Copyright Esomar2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; U.S. Appl. No. 17/024,580, filed Sep. 17, 2020.
Rosenberg; "Artificial Swarm Intelligence vs. Human Experts"; Neural Networks (IJCNN); 2016 International Joint Conference on IEEE; Jul. 24,2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and The Future of Collective Intelligence"; Singularity WebLog; https://www.singularityweblog.com/human-swarming-and-the-future-of-collective-intelligence/; Jul. 19,2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings ofthe European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=Eu-RyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1,2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/154,613, filed Oct. 8, 2018.
Rosenberg: U.S. Appl. No. 15/959,080, filed Apr. 20, 2018.
Salminen; "Collective Intelligence in Humans: A Literature Review"; Lappeenranta University of Technology, Lahti School of Innovation; 1Proceedings; 2012; 8 pages.
Search and Examination Report under Sections 17 & 18(3) for Application No. GB1805236.5 issued by the UK Intellectual Property Office dated Jan. 28, 2022.
Souppouris; "Playing 'Pokemon' with 78,000 People is Frustratingly Fun"; The Verge; Feb. 17, 2014; http://www.thevergecom/2014/2/17/5418690/play-this-twitch-plays-pokemon-crowdsource . . . ; downloaded Mar. 25, 2015; 3 pages.
Stafford; "How the Ouija Board Really Moves"; BBC Future; July 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Transforming Relationships; "Lottery: A tax on the statistically-challenged."; Chapter 4, Sec 4.1; Accessed on Oct. 8, 2021 at http://www.henry.k12.ga.us/ugh/apstat/chaptemotes/sec4.1.html (Year:2021); 3 pages.
Unanimous A. I.; "What is Swarm Intelligence"; 2015; http://unu.ai/swarm-intelligence/; downloaded Oct. 6, 2016; 3 pages.

(56) References Cited

OTHER PUBLICATIONS

USPTO; Non-Final Office Action for U.S. Appl. No. 17/024,474 dated Oct. 12, 2021.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Examiner Interview Summary for U.S. Appl. No. 16/059,698 dated Feb. 2, 2021.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Final Office Action for U.S. Appl. No. 16/059,698 dated Dec. 31, 2020.
USPTO; Non-Final Office Action for U.S. Appl. No. 14/738,768 dated Sep. 8, 2017.
USPTO; Non-Final Office Action for U.S. Appl. No. 17/024,580 dated Nov. 23, 2021.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/898,468 dated Mar. 3, 2020.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/059,698 dated Jun. 8, 2020.
USPTO; Non-Final Office Action for U.S. Appl. No. 16/130,990 dated Oct. 21, 2019.
USPTO; Non-Final Office Action for U.S. Appl. No. 16/147,647 dated Jan. 27, 2020.
USPTO; Non-Final Office Action for U.S. Appl. No. 16/154,613 dated Aug. 20, 2021.
USPTO; Non-Final Office Action for U.S. Appl. No. 16/230,759 dated Mar. 26, 2020.
USPTO; Non-Final Office Action for U.S. Appl. No. 16/668,970 dated Aug. 15, 2017.
USPTO; Notice of Allowance for U.S. Appl. No. 16/154,613 dated Nov. 3, 2021.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15//959,080 dated Jan. 31, 2020.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31,2019.
USPTO; Notice of Allowance for U.S. Appl. No. 15/898,468 dated May 1, 2020.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/059,698 dated Mar. 15, 2021.
USPTO; Notice of Allowance for U.S. Appl. No. 16/147,647 dated Mar. 18, 2020.
USPTO; Notice of Allowance for U.S. Appl. No. 16/230,759 dated Jul. 17, 2020.
USPTO; Notice of Allowance for U.S. Appl. No. 16/356,777 dated Jul. 22, 2020.
USPTO; Notice of Allowance for U.S. Appl. No. 16/904,239 dated Jun. 17, 2019.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Willcox; U.S. Appl. No. 16/356,777, filed Mar. 18, 2019.
Willcox; U.S. Appl. No. 17/024,474, filed Sep. 17, 2020.
Yeung et al.; "Metacognition in human decision-making: confidence and error monitoring"; Philosophical Transactions ofthe Royal Society B; 2012; pp. 1310-1321.
Combined Search and Examination Report under Sections 17 & 18(3) for G82202778.3 issued by the GB Intellectual Property Office dated Mar. 10, 2022.
Examination Report under Section 18(3) for GB1805236.5 mailed from the Intellectual Property Office dated Mar. 24, 2022.
Rosenberg; U.S. Appl. No. 17/744,464, filed May 13, 2022.
Search Report under Section 17 for GB2202778.3 issued by the GB Intellectual Property Office dated Mar. 4, 2022.
USPTO; Non-Final Office Action for U.S. Appl. No. 17/237,972 dated Jun. 27, 2022.
USPTO; Notice of Allowance for U.S. Appl. No. 17/024,580 dated Apr. 12, 2022.
USPTO: Notice of Allowance issued in U.S. Appl. No. 17/024,474 dated Apr. 11, 2022.
USTO; Notice of Allowance issued in U.S. Appl. No. 17/237,972 dated Jan. 18, 2023.
Willcox; U.S. Appl. No. 17/744,479, filed May 13, 2022.
Rosenberg; U.S. Appl. No. 17/237,972, filed Apr. 22, 2023.
Rosenberg: U.S. Appl. No. 15/815,579, filed Nov. 16, 2017.
Rosenberg; U.S. Appl. No. 18/114,954, filed Feb. 27, 2023.

(56) References Cited

OTHER PUBLICATIONS

Rosenberg; U.S. Appl. No. 16/230,759, filed Dec. 21, 2018.
Rosenberg; U.S. Appl. No. 18/194,056, filed Mar. 31, 2023.

* cited by examiner

INTERACTIVE BEHAVIORAL POLLING FOR AMPLIFIED GROUP INTELLIGENCE

This application is a continuation of U.S. application Ser. No. 16/154,613, entitled INTERACTIVE BEHAVIORAL POLLING AND MACHINE LEARNING FOR AMPLIFICATION OF GROUP INTELLIGENCE, filed Oct. 8, 2018, which claims the benefit of U.S. Provisional Application No. 62/569,909 entitled INTERACTIVE BEHAVIORAL POLLING AND MACHINE LEARNING FOR AMPLIFICATION OF GROUP INTELLIGENCE, filed Oct. 9, 2017, which is a continuation-in-part of U.S. application Ser. No. 16/059,698 entitled ADAPTIVE POPULATION OPTIMIZATION FOR AMPLIFYING THE INTELLIGENCE OF CROWDS AND SWARMS, filed Aug. 9, 2018, now U.S. Pat. No. 11,151,460, which claims the benefit of U.S. Provisional Application No. 62/544,861, entitled ADAPTIVE OUTLIER ANALYSIS FOR AMPLIFYING THE INTELLIGENCE OF CROWDS AND SWARMS, filed Aug. 13, 2017 and of U.S. Provisional Application No. 62/552,968 entitled SYSTEM AND METHOD FOR OPTIMIZING THE POPULATION USED BY CROWDS AND SWARMS FOR AMPLIFIED EMERGENT INTELLIGENCE, filed Aug. 31, 2017, which is a continuation-in-part of U.S. application Ser. No. 15/922,453 entitled PARALLELIZED SUB-FACTOR AGGREGATION IN REAL-TIME SWARM-BASED COLLECTIVE INTELLIGENCE SYSTEMS, filed Mar. 15, 2018, claiming the benefit of U.S. Provisional Application No. 62/473,424 entitled PARALLELIZED SUB-FACTOR AGGREGATION IN A REAL-TIME COLLABORATIVE INTELLIGENCE SYSTEMS filed Mar. 19, 2017, which in turn is a continuation-in-part of U.S. application Ser. No. 15/904,239 entitled METHODS AND SYSTEMS FOR COLLABORATIVE CONTROL OF A REMOTE VEHICLE, filed Feb. 23, 2018, now U.S. Pat. No. 10,416,666, claiming the benefit of U.S. Provisional Application No. 62/463,657 entitled METHODS AND SYSTEMS FOR COLLABORATIVE CONTROL OF A ROBOTIC MOBILE FIRST-PERSON STREAMING CAMERA SOURCE, filed Feb. 26, 2017 and also claiming the benefit of U.S. Provisional Application No. 62/473,429 entitled METHODS AND SYSTEMS FOR COLLABORATIVE CONTROL OF A ROBOTIC MOBILE FIRST-PERSON STREAMING CAMERA SOURCE, filed Mar. 19, 2017, which is a continuation-in-part of U.S. application Ser. No. 15/898,468 entitled ADAPTIVE CONFIDENCE CALIBRATION FOR REAL-TIME SWARM INTELLIGENCE SYSTEMS, filed Feb. 17, 2018, now U.S. Pat. No. 10,712,929, claiming the benefit of U.S. Provisional Application No. 62/460,861 entitled ARTIFICIAL SWARM INTELLIGENCE WITH ADAPTIVE CONFIDENCE CALIBRATION, filed Feb. 19, 2017 and also claiming the benefit of U.S. Provisional Application No. 62/473,442 entitled ARTIFICIAL SWARM INTELLIGENCE WITH ADAPTIVE CONFIDENCE CALIBRATION, filed Mar. 19, 2017, which is a continuation-in-part of U.S. application Ser. No. 15/815,579 entitled SYSTEMS AND METHODS FOR HYBRID SWARM INTELLIGENCE, filed Nov. 16, 2017, now U.S. Pat. No. 10,439,836, claiming the benefit of U.S. Provisional Application No. 62/423,402 entitled SYSTEM AND METHOD FOR HYBRID SWARM INTELLIGENCE filed Nov. 17, 2016, which is a continuation-in-part of U.S. application Ser. No. 15/640,145 entitled METHODS AND SYSTEMS FOR MODIFYING USER INFLUENCE DURING A COLLABORATIVE SESSION OF REAL-TIME COLLABORATIVE INTELLIGENCE, filed Jun. 30, 2017, now U.S. Pat. No. 10,353,551, claiming the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLIGENCE filed Jul. 3, 2016, which is a continuation-in-part of U.S. application Ser. No. 15/241,340 entitled METHODS FOR ANALYZING DECISIONS MADE BY REAL-TIME INTELLIGENCE SYSTEMS, filed Aug. 19, 2016, now U.S. Pat. No. 10,222,961, claiming the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, which is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, claiming the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, which is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016, now U.S. Pat. No. 10,310,802, claiming the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, which is a continuation-in-part of U.S. patent application Ser. No. 15/052,876, filed Feb. 25, 2016, entitled DYNAMIC SYSTEMS FOR OPTIMIZATION OF REAL-TIME COLLABORATIVE INTELLIGENCE, now U.S. Pat. No. 10,110,664, claiming the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, which is a continuation-in-part of U.S. application Ser. No. 15/047,522 entitled SYSTEMS AND METHODS FOR COLLABORATIVE SYNCHRONOUS IMAGE SELECTION, filed Feb. 18, 2016, now U.S. Pat. No. 10,133,460, which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, which is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, which is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015, now U.S. Pat. No. 10,551,999, which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, which is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015, now U.S. Pat. No. 10,277,645, which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, which is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015, now U.S. Pat. No. 10,122,775, which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, which is a continuation-in-part of U.S. patent application Ser. No. 14/738,768 entitled INTUITIVE INTERFACES FOR REAL-TIME COLLABORATIVE INTELLIGENCE, filed Jun. 12, 2015, now U.S. Pat. No. 9,940,006, which in turn claims the benefit of U.S. Provisional Application 62/012,403 entitled INTUITIVE INTERFACE FOR REAL-TIME COLLABORATIVE CONTROL, filed Jun. 15, 2014, which is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, which is a continuation-in-part of U.S. patent application Ser. No. 14/668,970 entitled METHODS AND SYSTEMS FOR REAL-TIME COLLABORATIVE INTELLIGENCE, filed Mar. 25, 2015, now U.S. Pat. No. 9,959,028, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

BACKGROUND OF THE INVENTION

1. Field of the Invention

The present invention relates generally to systems and methods for real-time swarm-based collective intelligence, and more specifically to systems and methods for selection of users for real-time closed-loop dynamic collaborative control systems.

2. Discussion of the Related Art

The aggregation of insights collected from groups of people has been shown to amplify intelligence in certain situations. Sometimes called the Wisdom of Crowds, these methods generally use statistical averaging across a static set of data collected from a population through survey-based polling. While these methods have shown mild amplifications of intelligence, a significant problem with all common Wisdom of Crowd methods is that human participants are very poor at expressing their internal feelings in a consistent and repeatable manner that can be aggregated across populations. People vary wildly in the level of confidence (or conviction) they have in their reported answers, and their internal scales for reporting measures of confidence are non-linear and very different from person to person. Simply put, people are very bad at "self-reporting" their internal thoughts, insights, intuitions, estimation, and opinions on surveys in way that captures the magnitude of their confidence or conviction such that it can be effectively aggregated across populations. Therefore, there exists a need to re-invent the polling process by capturing a far richer set of data, processing not just what each user reports, but processing how that user behaves. In addition, there exists a need for a more accurate and more consistent model of user confidence and conviction than traditional reporting, and enabling of real-time dynamic behavioral data (such as crowd data and/or swarm data) to be aggregated across populations in a manner that optimizes the Group Intelligence of a population, enabling significantly more accurate predictions, forecasts, and subjective recommendations.

SUMMARY OF THE INVENTION

Several embodiments of the invention advantageously address the needs above as well as other needs by providing a system for interactive behavioral polling comprising: a plurality of computing devices, each including a display, a user interface, an interactive polling application running on the computing device, and configured for network communication; a server in networked communication with each of the plurality of computing devices, the server including at least one database and a server application running on the server, wherein the system is configured to: display, on each of the computing devices, a first prompt and a dynamic user interface for capturing a user's dynamic response to the first prompt; during a first time period, collect and store data from each of the plurality of computing devices reflecting the user's dynamic interaction with the dynamic user interface in response to first prompt; after the first time period has ended, perform a perturbation analysis using the data collected during the first time period; display a perturbation stimulus on each of the plurality of computing device; display a second prompt on each of the plurality of computing device indicating a user opportunity for additional interaction with the dynamic user interface; during a second time period, collect and store data from each of the plurality of computing devices reflecting each user's dynamic interaction with the dynamic user interface in response to the second prompt; calculate a prediction based at least in part on data collected from the plurality of computing devices during at least one of the time periods; and display the prediction on at least one computing device.

In another embodiment, the invention can be characterized as a method for interactive behavioral polling comprising: displaying, on each of a plurality of computing devices, each computing device including a display, a user interface, an interactive polling application running on the computing device, and configured for network communication, a first prompt and a dynamic user interface for capturing a user's dynamic response to the first prompt; during a first time period, collecting and storing data from each of the plurality of computing devices reflecting the user's dynamic interaction with the dynamic user interface in response to first prompt; after the first time period has ended, performing a perturbation analysis using the data collected during the first time period; displaying a perturbation stimulus on each of the plurality of computing devices; displaying a second prompt on each of the plurality of computing devices indicating a user opportunity for additional interaction with the dynamic user interface; during a second time period, collecting and storing data from each of the plurality of computing devices reflecting each user's dynamic interaction with the dynamic user interface in response to the second prompt; calculating a prediction based at least in part on data collected from the plurality of computing devices during at least one of the time periods; and displaying the prediction on at least one computing device.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
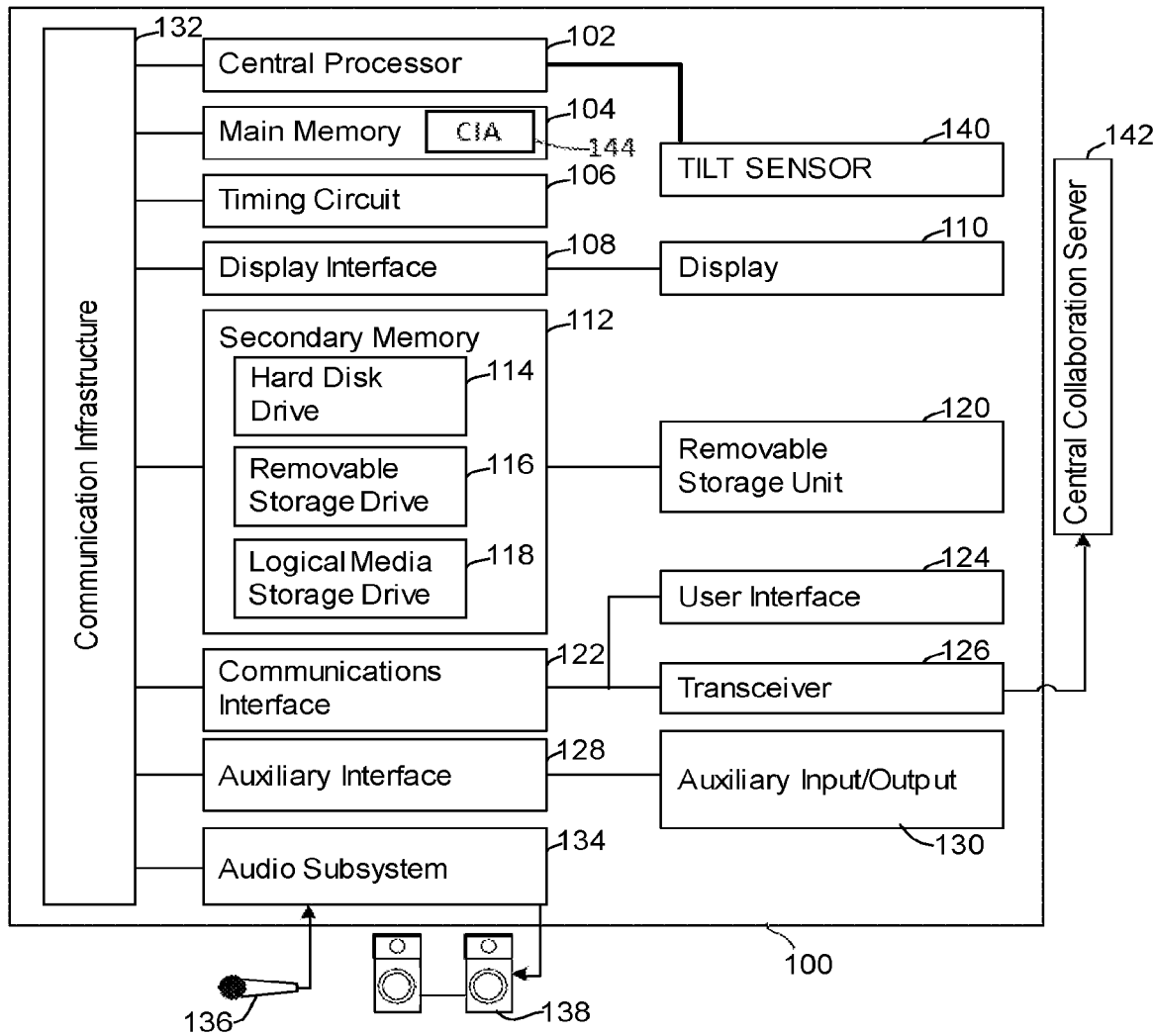
FIG. 1 is a schematic diagram of an exemplary computing device configured for use in a collaboration system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Real-time occurrences as referenced herein are those that are substantially current within the context of human perception and reaction.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Historical research demonstrates that the insights generated by groups can be more accurate than the insights generated by individuals in many situations. A classic example is estimating the number of beans in a jar. Many researchers have shown that taking the statistical average of estimates made by many individuals will yield an answer that is more accurate than the typical member of the population queried. When the individuals provide their input as isolated data points, to be aggregated statistically, the process is often referred to as "crowdsourcing". When the individuals form a real-time system and provide their input together, with feedback loops enabling the group to converge on a solution in synchrony, the process is often referred to as "swarming". While very different entities, crowds and swarms both share one characteristic—the thoughts, feelings, insights, and intuitions of human participants need to be captured and represented as data in an accurate manner that can be processed across trials and across populations. Inconsistencies in the data captured from participants, because of difficulties in expressing their internal thinking as external reports can significantly degrade the ability to amplify the intelligence of a population. Swarms outperform crowds because they capture data indicating behaviors of participants, but the requirement that all members of a swarm participate at the same time, is a logistical constraint. What is needed is a method that combines the asynchronous benefits of polling (i.e. the participants do not need to all be engaged at the same time) and the behavioral benefits of swarming (i.e. that participant don't just report, they interact over time, revealing far more about their internal thinking than they might even be able to consciously express). The present invention addresses this by create a new form of interactive behavioral polling, combined with machine learning, to optimize the collective intelligence and/or collective insights of populations.

Collaborative Intelligence Systems and Methods

Systems and methods for collaborative swarm intelligence are disclosed in the related applications.

As described in related U.S. Pat. No. 9,959,028 for METHODS AND SYSTEMS FOR REAL-TIME CLOSED-LOOP COLLABORATIVE INTELLIGENCE, by the present inventor, and incorporated by reference, a swarm-based system and methods have been developed that enable groups of users to collaboratively control the motion of a graphical pointer through a unique real-time closed-loop control paradigm. In some embodiments, the collaboratively controlled pointer is configured to empower a group of users to choose letters, words, numbers, phrases, and/or other choices in response to a prompt posed simultaneously to the group. This enables the formation a group response that's not based on the will of any individual user, but rather on the collective will of the group. In this way, the system disclosed herein enables a group of people to express insights as a unified intelligence, thereby making decisions, answering questions, rendering forecasts, and making predictions as an artificial swarm intelligence.

As described in U.S. patent application Ser. No. 14/708,038 for MULTI-GROUP METHODS AND SYSTEMS FOR REAL-TIME MULTI-TIER COLLABORATIVE INTELLIGENCE, by the current inventor and incorporated by reference, additional systems and methods have been disclosed that encourage groups of real-time users who are answering questions as a swarm to produce coherent responses while discouraging incoherent responses. A number of methods were disclosed therein, including (a) Coherence Scoring, (b) Coherence Feedback, and (c) Tiered Processing. These and other techniques greatly enhance the effectiveness of the resulting intelligence.

As described in U.S. patent application Ser. No. 14/859,035 for SYSTEMS AND METHODS FOR ASSESSMENT AND OPTIMIZATION OF REAL-TIME COLLABORATIVE INTELLIGENCE SYSTEMS, by the present inventor and incorporated by reference, a system and methods have been developed for enabling artificial swarms to modify its participant population dynamically over time, optimizing the performance of the emergent intelligence by altering its population makeup and/or the altering the relative influence of members of within that population. In some such embodiments the members of a swarm can selectively eject one or more low performing members of that swarm (from the swarm), using the group-wise collaborative decision-making techniques herein. As also disclosed, swarms can be configured to dynamically adjust its own makeup, not by ejecting members of the swarm but by adjusting the relative weighting of the input received from members of the swarm. More specifically, in some embodiments, algorithms are used to increase the impact (weighting) that some users have upon the closed-loop motion of the pointer, while decreasing the impact (weighting that other users have upon the closed-loop motion of the pointer. In this way, the swarm intelligence is adapted over time by the underlying algorithms disclosed herein, strengthening the connections (i.e. input) with respect to the more collaborative users, and weakening the connections with respect to the less collaborative users.

One thing that both poll-based methods and swarm-based methods have in common when making predictions, is that a smarter population generally results in a smarter Collective Intelligence. As described in U.S. patent application Ser. No. 16/059,698 for ADAPTIVE POPULATION OPTIMIZATION FOR AMPLIFYING THE INTELLIGENCE OF CROWDS AND SWARMS, by the present inventor and incorporated by reference, methods and systems are disclosed that enables the use of polling data to curate a refined population of people to form an emergent intelligence. While this method is highly effective, by enabling dynamic behavioral data in the polling process, far deeper and more accurate assessments of human confidence and human conviction are attained and used to significantly improve the population curation process. Specifically, this enables higher accuracy when distinguishing members of the population of are likely to be high-insight performers on a given prediction task as compared to members of the population who are likely to be low-insight performers on a given prediction task, and does so without using historical data about their performance on similar tasks.

Referring first to FIG. 1, as previously disclosed in the related patent applications, a schematic diagram of an exemplary portable computing device 100 configured for use in the collaboration system is shown. Shown are a central processor 102, a main memory 104, a timing circuit 106, a display interface 108, a display 110, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, a central collaboration server 142, and a collaborative intent application 144.

Each of a plurality of portable computing devices 100, each used by one of a plurality of users (the plurality of users also referred to as a group), is networked in real-time to the central collaboration server (CCS) 142. In some embodiments, one of the portable computing devices 100 could act as the central collaboration server 142. For the purposes of this disclosure, the central collaboration server 142 is its own computer system in a remote location, and not the portable computing device 100 of one of the users. Hence the collaboration system is comprised of the centralized central collaboration server 142 and the plurality of portable computing devices 100, each of the portable computing devices 100 used by one user.

The portable computing device 100 may be embodied as a handheld unit, a pocket housed unit, a body worn unit, or other portable unit that is generally maintained on the person of a user. The portable computing device 100 may be wearable, such as transmissive display glasses.

The central processor 102 is provided to interpret and execute logical instructions stored in the main memory 104. The main memory 104 is the primary general purpose storage area for instructions and data to be processed by the central processor 102. The main memory 104 is used in the broadest sense and may include RAM, EEPROM and ROM. The timing circuit 106 is provided to coordinate activities within the portable computing device 100. The central processor 102, main memory 104 and timing circuit 106 are directly coupled to the communications infrastructure 132. The central processor 102 may be configured to run a variety of applications, including for example phone and address book applications, media storage and play applications, gaming applications, clock and timing applications, phone and email and text messaging and chat and other communication applications. The central processor 102 is also configured to run at least one Collaborative Intent Application (CIA) 144. The Collaborative Intent Application 144 may be a standalone application or may be a component of an application that also runs upon other networked processors.

The portable computing device 100 includes the communications infrastructure 132 used to transfer data, memory addresses where data items are to be found and control signals among the various components and subsystems of the portable computing device 100.

The display interface 108 is provided upon the portable computing device 100 to drive the display 110 associated with the portable computing device 100. The display interface 108 is electrically coupled to the communications infrastructure 132 and provides signals to the display 110 for visually outputting both graphics and alphanumeric characters. The display interface 108 may include a dedicated graphics processor and memory to support the displaying of graphics intensive media. The display 110 may be of any type (e.g., cathode ray tube, gas plasma) but in most circumstances will usually be a solid state device such as liquid crystal display. The display 110 may include a touch screen capability, allowing manual input as well as graphical display.

Affixed to the display 110, directly or indirectly, is the tilt sensor 140 (accelerometer or other effective technology) that detects the physical orientation of the display 110. The tilt sensor 140 is also coupled to the central processor 102 so that input conveyed via the tilt sensor 140 is transferred to the central processor 102. The tilt sensor 140 provides input to the Collaborative Intent Application 144, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 118 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 120 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the portable computing device 100 and the means by which the portable computing device 100 conveys information to the user. In the present invention, the user interface 124 is controlled by the CIA 144 and is configured to display information regarding the group collaboration, as well as receive user input and display group output.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the portable computing device 100 and the Central Collaboration Server 142. The transceiver 126 could also be used to enable communication among a plurality of portable computing devices 100 used by other participants. In some embodiments, one of the portable computing devices 100 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the portable computing devices 100 establish an ad hock network between and among them, as with a BlueTooth® communication technology.

It should be noted that any prevailing wireless communication standard may be employed to enable the plurality of portable computing devices 100 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may issue a suggestion as a verbal utterance. The portable computing device 100 may then capture the verbal utterance, digitize the utterance, and convey the utterance to other of said plurality of users by sending it to their respective portable computing devices 100 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their portable electronic devices 100 and taking advantage of the tallying, processing, and electronic decision determination and communication processes disclosed herein. In this way the present invention may act as a supportive supplement that is seamlessly integrated into a direct face to face conversation held among a group of users.

For embodiments that do include the microphone 136, it may be incorporated within the casing of the portable computing device 100 or may be remotely located elsewhere upon a body of the user and is connected to the portable computing device 100 by a wired or wireless link. Sound signals from microphone 136 are generally captured as analog audio signals and converted to digital form by an analog to digital converter or other similar component and/or process. A digital signal is thereby provided to the processor 102 of the portable computing device 100, the digital signal representing the audio content captured by microphone 136. In some embodiments the microphone 136 is local to the headphones 138 or other head-worn component of the user. In some embodiments the microphone 136 is interfaced to the portable computing device 100 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the portable computing device 100 by the Bluetooth® communication link.

The portable computing device 100 includes an operating system, the necessary hardware and software drivers necessary to fully utilize the devices coupled to the communications infrastructure 132, media playback and recording applications and at least one Collaborative Intent Application 144 operatively loaded into main memory 104, which is designed to display information to a user, collect input from that user, and communicate in real-time with the Central Collaboration Server 142. Optionally, the portable computing device 100 is envisioned to include at least one remote authentication application, one or more cryptography applications capable of performing symmetric and asymmetric cryptographic functions, and secure messaging software. Optionally, the portable computing device 100 may be disposed in a portable form factor to be carried by a user.

Figure 2:
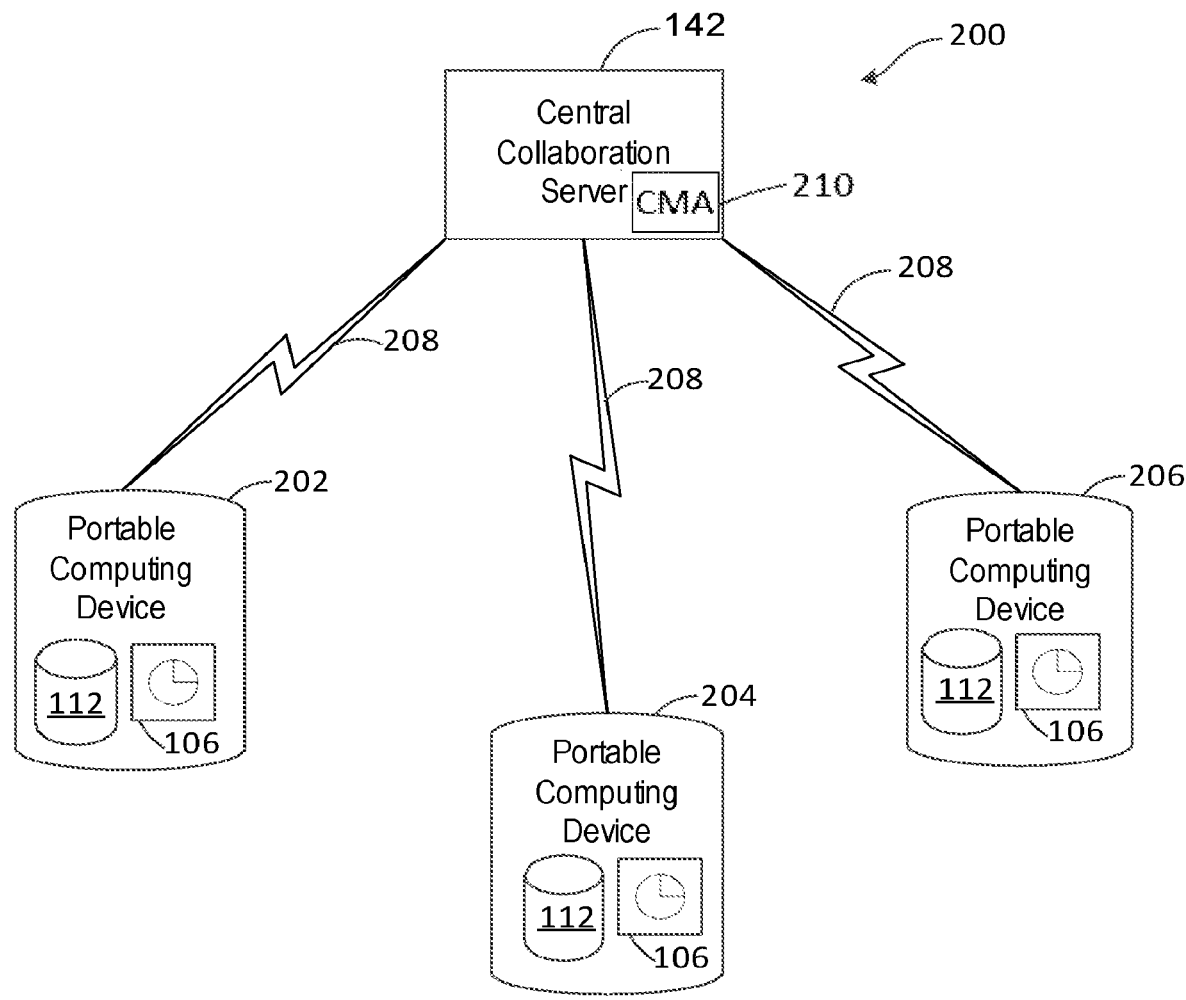
FIG. 2 is a schematic diagram of an exemplary real-time collaboration system.

Referring next to FIG. 2, a collaboration system 200 is shown in one embodiment of the present invention. Shown are the central collaboration server 142, a plurality of the secondary memory subsystems 112, a plurality of the timing circuits 106, a first portable computing device 202, a second portable computing device 204, a third portable computing device 206, and a plurality of exchanges of data 208.

The group of users (participants), each using one of the plurality of portable computing devices 100, each portable computing device 100 running the Collaborative Intent Application 144, each device 100 in communication with the Central Collaboration Server 142, may engage in the collaborative experience that evokes a collective intelligence (also referred to as Collective Consciousness).

As shown in FIG. 2, the CCS 142 is in communication with the plurality of portable computing devices 202, 204, 206. Each of these devices 202, 204, 206 is running the Collaborative Intent Application (CIA) 144. In one example, each of the devices 202, 204, 206 is an iPad® running the CIA 144, each iPad® communicating with the CCS 142 which is running a Collaboration Mediation application (CMA) 210. Thus, we have the local CIA 144 on each of the plurality of devices 202, 204, 206, each device 202, 204, 206 in real-time communication with the CMA running on the CCS 142. While only three portable devices 202, 204, 206 are shown in FIG. 2 for clarity, in ideal embodiments, dozens, hundreds, thousands, or even millions of devices 100 would be employed in the collaboration system 200. Hence the CCS 142 must be in real-time communication with many devices 100 at once.

The communication between the CCS 142 and each of the devices 202, 204, 206 includes the exchanges of data 208. The data has a very significant real-time function, closing the loop around each user, over the intervening electronic network.

As described above, the present invention allows the group of users, each using their own tablet or phone or other similar portable computing device 100, to collaboratively answer questions in real-time with the support of the mediating system of the CCS 142 which communicates with the local CIA 144 running on each device 100. The Collaborative Intent Application 144 ties each device 100 to the overall collaborative system 200. Multiple embodiments of the CIA 144 are disclosed herein. The Collaborative Intent Application (CIA) 144 may be architected in a variety of ways to enable the plurality of portable computing devices 100 to engage in the collaborative processes described herein, with the supportive use of the Central Collaboration Server 142.

In some embodiments the exchange of data 208 may exist between portable computing devices 100.

Figure 3:
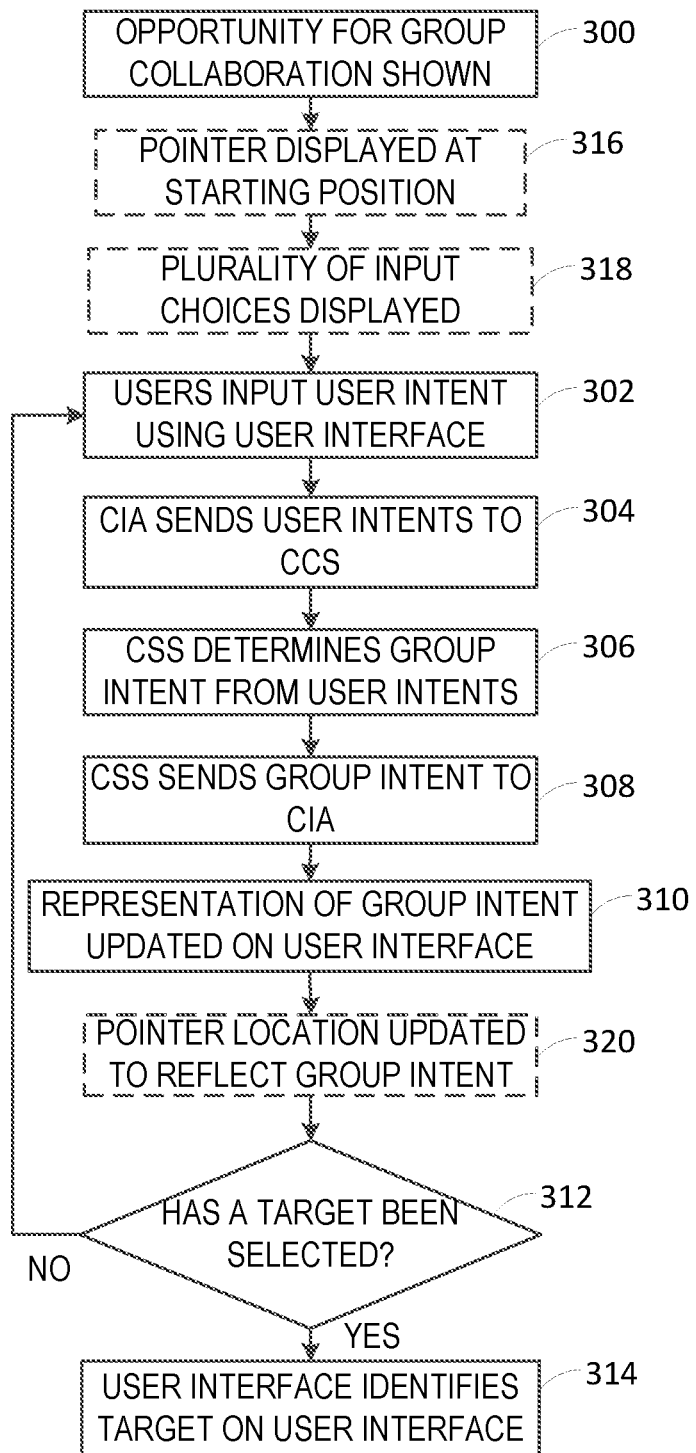
FIG. 3 is a flowchart of an exemplary group collaboration process using the collaboration system.

Referring next to FIG. 3, a flowchart of one embodiment of a group collaboration process is shown. Shown are a collaboration opportunity step 300, a user input step 302, a send user intents to CCS step 304, a determine group intent step 306, a send group intent to CIA step 308, a display intents step 310, a target selection decision point 312, and a display target step 314. The process also includes optional steps that could be included, for example, for a pointer graphical embodiment: a display pointer start position step 316, a display input choices step 318, and an update pointer location step 320. In the collaboration opportunity step 300, the CIA 144 receives the group collaboration opportunity from the CCS 142 and displays the opportunity on the display 110 of the portable computing device 100 (PCD). The group collaboration opportunity may be a question to be answered, for example, "What film will win the Best Picture in the Academy Awards?" or "Who will win the Super Bowl?" The process then proceeds to the user input step 302. The user input step 302 includes the user using the display 110 of the computing device 100 to input the user intent. The user intent is an input interpreted by the user interface 124 as a desired vector direction conveying an intent of the user. In some embodiments (described in the related applications), the user intent is a desired vector direction of a graphical pointer of the user interface 124, and the user input includes swiping of the pointer via the touchscreen interface. The user input step 302 takes place for each user of the group. The process then proceeds to the send user intent to CCS step 304.

In the send user intent to CCS step 304, the CIA 144 for each PCD 100 sends the user intent to the CCS 142. In the next step, the determine group intent step 306, the CCS 142 determines a collective group intent based on the plurality of user intents. The group intent may be determined through various methods, as described further below. The process then proceeds to the send group intent to CIA step 308.

In the embodiment including the optional steps display pointer start position 316 and the display input choices step 318, in the display pointer start position step 316 the graphical user interface 124 would display the starting, or neutral, position of a pointer chosen to indicate the graphical representation of the group intent. In the following step, the display input choices step 318, the user interface 124 would display a plurality of input choices 412 available to be selected by the group intent by using the pointer. The user intent in this embodiment is an input interpreted by the user interface 124 as representing that user's desired motion of the collaborative graphical pointer with respect to the plurality of input choices.

In the send group intent to CIA step 308, the CIA 144 receives the group intent from the CCS 142. Next, in the display intents step 310, for each computing device 100 the received representation of the group intent is displayed, along with a representation of the user intent originally input by the user of the computing device 100. The process then proceeds to the target selection decision point 312.

The update pointer location step 320 may be inserted between the display intents step 310 and the target selection decision point 312. In the update pointer location step 320, in the embodiments including the pointer the user interface 124 updates to indicate the current location of the pointer in response to the received group intent.

In the target selection decision point 312, if the group intent received corresponds to selection of the target (in some embodiments, from among the input choices), the process proceeds to the display target step 314, and the selected target is displayed on the display 124. If the group intent has not selected the target, the process returns to the user input step 302, and the process repeats until the target is determined by the group intent or until the process is otherwise ended (for example, by a time limit).

After the target has been chosen by the group intent, the entire process may repeat, for example, to form a word if each consecutive target is an alphabetic character.

Referring again to FIGS. 1, 2 and 3, the collaboration system in one embodiment as previously disclosed in the related applications employs the CCS 142 that users connect to via their portable computing device 100. In some embodiments, fixed or non-portable computing devices 100 can be used as well. In many embodiments, users choose or are assigned a username when they log into the CCS 142, thus allowing software on the CCS 142 to keep track of individual users and assign each one a score based on their prior sessions. This also allows the CCS 142 to employ user scores when computing the average of the group intent of all the users (in embodiments that use the average).

In general, when the session is in progress, the question is sent from the CCS 142 to each of the CIA 144 on the portable computing devices 100 of the users. In response to the question, the users convey their own intent either by manipulating an inner puck of the pointer, as described in the related applications, or by using a tilt or swipe input or other user interface methods. In some embodiments, the user's intent is conveyed as a direction and a magnitude (a vector) that the user wants the pointer to move. This is a user intent vector and is conveyed to the CCS 142. In some embodiments, the magnitude of the user intent vector is constant. The CCS 142 in some embodiments computes the numerical average (either a simple average or a weighted average) of the group intent for the current time step. Using the numerical average, the CCS 142 updates for the current time step the graphical location of the pointer within a target board displayed on the display 110. This is conveyed as an updated coordinate location sent from the CCS 142 to each of the CIA 144 of participating users on their own devices 100. This updated location appears to each of the users on their individual devices 100. Thus they see the moving pointer, ideally heading towards an input choice on the target board. The CCS 142 determines if and when the input choice is successfully engaged by the pointer and if so, that target is selected as an answer, or as a part of the answer (a single letter or space or punctuation mark, for example, that's added to an emerging answer). That target is then added to the emerging answer, which is sent to all the devices 100 and appears on each display 110.

While FIG. 3 illustrates one embodiment of the collaborative process, as shown in the related applications, many variations of the basic process are contemplated by the inventor.

Interactive Behavioral Polling and Machine Learning

Human participants possess deep insights across a vast range of topics, having knowledge, wisdom, and intuition that can be harnessed and combined to build an emergent collective intelligence. A significant problem, however, is that people are very bad at reporting the sentiments inside their heads and are even worse at expressing their relative levels of confidence and/or conviction in those sentiments. Reports from human participants are inconsistent from trial to trial, using scales that are highly non-linear, and highly inconsistent from participant to participant. To solve this problem, innovative methods and systems have been developed to change the process of poll-based "reporting" to a dynamic process of "behaving" such that behavioral data is collected and processed which gives far deeper insights into the true sentiments of human participants, as well as far deeper insights into the confidence and/or conviction that go with the expressed sentiments.

The methods and systems involve providing a question prompt, providing a dynamic interface with data that is tracked and stored over time, and providing a countdown timer that puts temporal pressure on the participant to drive their behavior.

The methods and systems further involve then providing the perturbation prompt which inspires the participant to adjust their answer, while again providing the dynamic interface with data that is tracked and stored over time, and providing the countdown timer that puts temporal pressure on the participant to drive their behavior. The perturbation prompt is an authoritative reference point which may be a real or fictional indication of an alternative view on the answer in many preferred embodiments. The usefulness of a fictional indication is that the direction and magnitude of the perturbation (with respect to the participant's initial answer) can be varied across the pre-planned spectrum across trials and across the population, so as to capture a spectrum of behavioral data for processing and machine learning.

Figure 4:
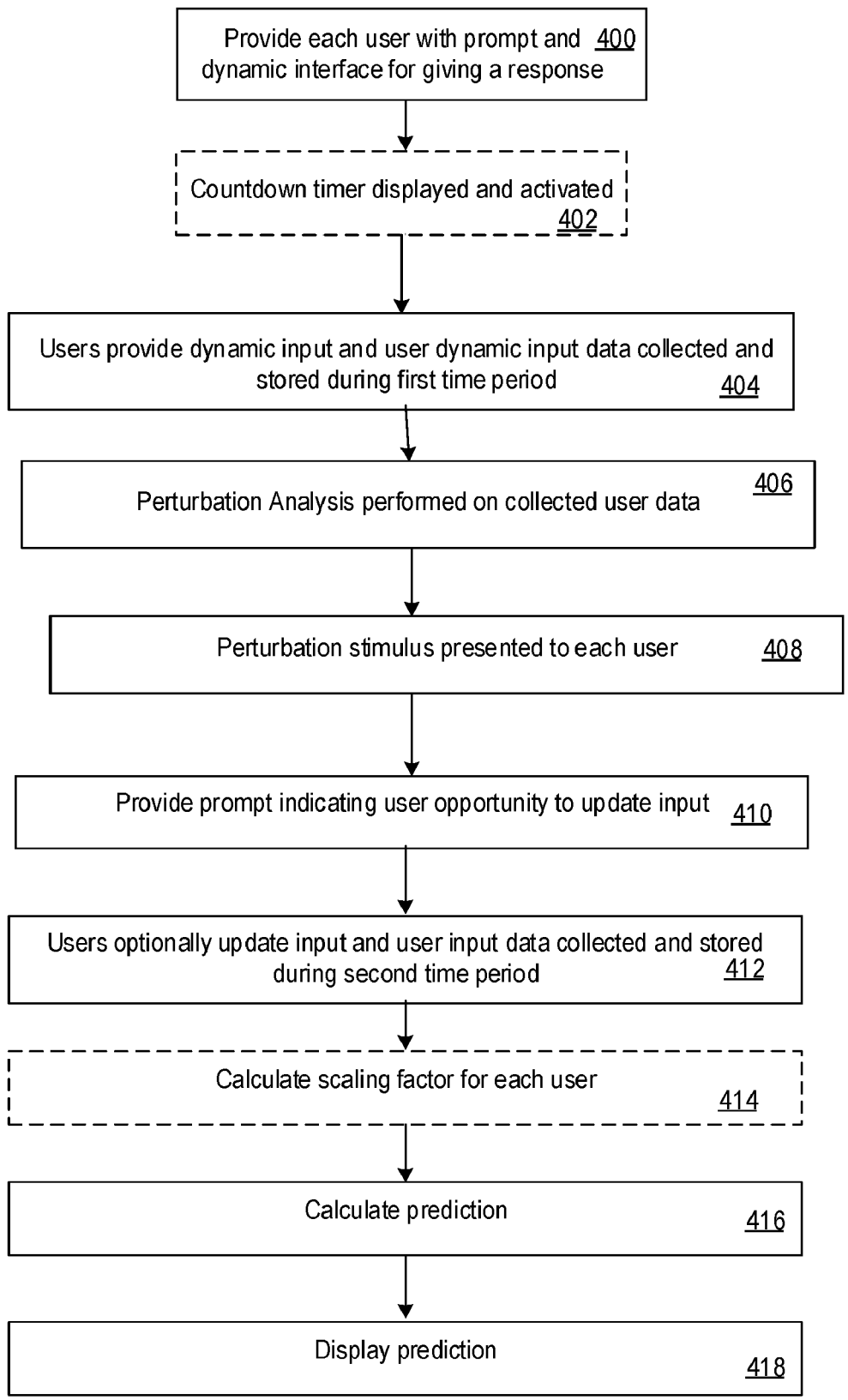
FIG. 4 is a flowchart of a method for interactive behavioral polling in accordance with some embodiments of the present invention.

Referring next to FIG. 4, a flowchart of a method for interactive behavioral polling in accordance with some embodiments of the present invention is shown. In one embodiment, the method is implemented with an embodiment of the distributed architecture described in the related applications (generally, with each user interacting with the computing device 100 and group computations performed by the CCS 142, although it will be understood that other suitable computing and networking systems may be used to implement the methods described herein). Dynamic user interfaces for an example of the interactive behavioral polling are shown in FIGS. 5-8.

Generally, Human participants possess deep insights across a vast range of topics, having knowledge, wisdom, and intuition that can be harnesses and combined to build a collective intelligence. A significant problem, however, people are very bad at reporting the sentiments inside their heads and are even worse at expressing their relative levels of confidence and/or conviction in those sentiments. Reports from human participants are inconsistent from trial to trial, using scales that are highly non-linear, and highly inconsistent from participant to participant. To solve this problem, these innovative methods and systems have been developed to change the process of poll-based "reporting" to a dynamic process of "behaving" such that behavioral data is collected and processed which gives far deeper insights into the true sentiments of human participants, as well as far deeper insights into the confidence and/or conviction that go with the expressed sentiments.

The interactive behavioral polling method involves providing a prompt to each user in the group, providing a dynamic interface with data that is tracked and stored over time, and providing a countdown timer that puts temporal pressure on each participant to drive their behavior.

The methods and systems further involve then providing a perturbation prompt which inspires each participant to adjust their answer, while again providing dynamic interface with data that is tracked and stored over time, and providing a countdown timer that puts temporal pressure on the participant to drive their behavior. The perturbation prompt is an authoritative reference point which may be a real or fictional indication of an alternative view on the answer in many preferred embodiments. The usefulness of a fictional indication is that the direction and magnitude of the perturbation (with respect to the participants initial answer) can be varied across the pre-planned spectrum across trials and across the population, so as to capture a spectrum of behavioral data for processing and machine learning.

A good way to describe the systems and methods enabled by the hardware and software disclosed herein is by example. In the example illustrated in FIGS. 5-9, the example is a sports prediction, although the same methods and systems can be used for financial predictions, political predictions, and other types of prediction. The same methods and systems can also be used for capturing and amplifying the accuracy of subjective sentiments, such as views and opinions of a population.

In this example, the objective is to predict the outcome of football games, forecasting both the winner of the game and the number of points the winner wins by. In this example, a set of 15 games will be forecast by a population of 100 human participants, with the objective of aggregating the data from the 100 human participants to generate the most accurate group forecast possible. Traditionally, this would be done by asking a single question and capturing static data, which has all the problems described above. In the inventive system and method, a dynamic process is provided using a unique interface, unique prompts, and unique timer, and a unique machine learning process.

FIGS. 5-9 show an exemplary user interface for a single user in the group for one forecasted game at various points in time during the interactive behavioral polling method of FIG. 4. This example is a sports prediction, although the same methods and systems can be used for financial predictions, political predictions, and other types of prediction. The same methods and systems can also be used for capturing and amplifying the accuracy of subjective sentiments, such as views and opinions of a population. In this example, the objective is to predict football games, forecasting both the winner of the game and the number of points the winner wins by. In this example, a set of 15 games will be forecast by a population of 100 human participants, with the objective of aggregating the data from the 100 human participants to generate the most accurate group forecast possible. Traditionally, this would be done by asking a single question and capturing static data, which has all the problems described above. In the inventive system and method, a dynamic process is provided using a unique interface, unique prompts, and unique timer, and a unique machine learning process.

Figure 5:
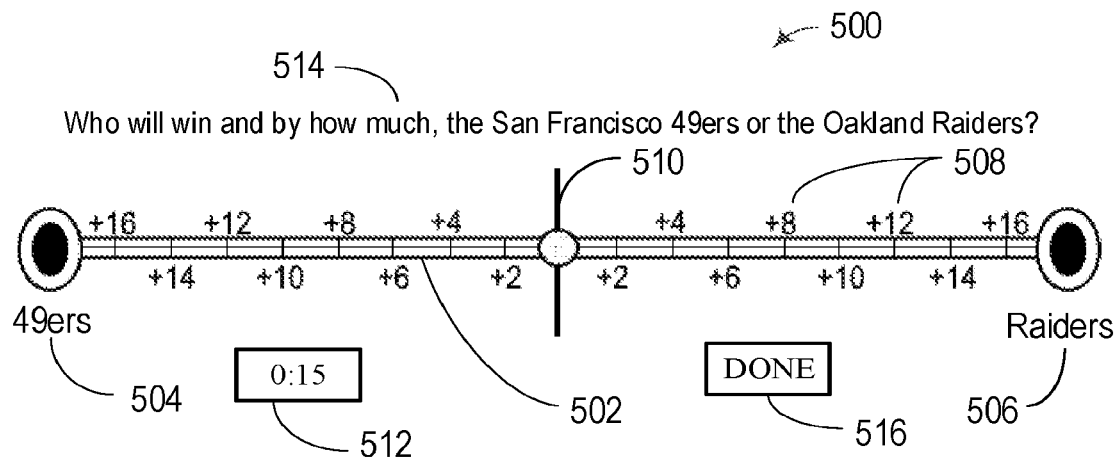
FIG. 5 is an exemplary user interface at a first point in time during an exemplary interactive behavioral polling session in accordance with some embodiments of the present invention.

In a first provide prompt and dynamic user interface step 400 of the interactive behavioral polling method, the CCS 142 sends to each computing device 100 instructions and data for displaying the prompt and the dynamic user interface. A dynamic user interface is presented to each user. As illustrated in FIG. 5, an exemplary user interface 500 is shown during the first step 400. The dynamic user interface 500 includes a selection line 502, a first choice 504 located at a left-hand end of the selection line 502, a second choice 506 at a right-hand end of the selection line 502, a plurality of selection values 508, each associated with a point on the selection line 502, and a moveable slider 510. In FIG. 5 the slider 510 is shown at an initial origin location on the selection line 502, but the slider 510 may initially be shown at any location on the selection line 502. Also shown is a countdown timer 512 and the prompt 514.

In this example, the first choice 504 is displayed as "49ers" and the second choice 506 is displayed as "Raiders". The selection values 508 range from +16 on the 49ers (left) side to +16 on the Raiders (right) side of the selection line 502. An origin is located at the center of the selection line 502. The prompt 514 is displayed as "Who will win and by how much, the San Francisco 49ers or the Oakland Raiders?".

It will be understood by those of ordinary skill in the art that although the exemplary interface is a slider, the dynamic data collecting and prompting methods can be achieved with a variety of other layouts.

As illustrated in the exemplary display 500, in this case the prompt 514 is a textual question, and the interface is a sliding-type interface. The prompt 514 will appear on the screen under software control of the computing device 100, allowing control of the exact timing of when the user reads the question and provides a response. In preferred embodiments, during step 402, the countdown timer 512 also initially appears. The countdown of the time will give time pressure to the user. As shown in FIG. 5 below, the slider 510 is moveable by the user along the selection line 502 and enables the user to choose which team will win, and by how many points, by positing the slider 510 to the left or right by a given amount. This can be done by a mouse or touchscreen interface, or by gesture interface. The display 500 may also include a "done" button 516, which would, during the time period, end the time period even if there is still time left in the time period.

In the next provide dynamic input step 404, during a pre-determined time period the user is allowed to provide input to indicate his response to the prompt. If the countdown timer 512 is shown, the countdown timer 512 counts down during the time period. During the dynamic input step 404, the computing device 100 tracks the user input, collecting data about the timing, position, speed, acceleration, and trajectory of the user's response using the dynamic interface (in this case the slider 512). Any time delay between the prompt 514 appearing on the display and a first motion of the slider 512 is captured as well. This behavioral information reflects not just a reported final answer, but also indicates the internal confidence and/or conviction the participant has in the expressed value, especially when processed by machine learning in later steps. For example, a slower movement of the slider may result in the user being assigned a lower confidence value.

Figure 6:
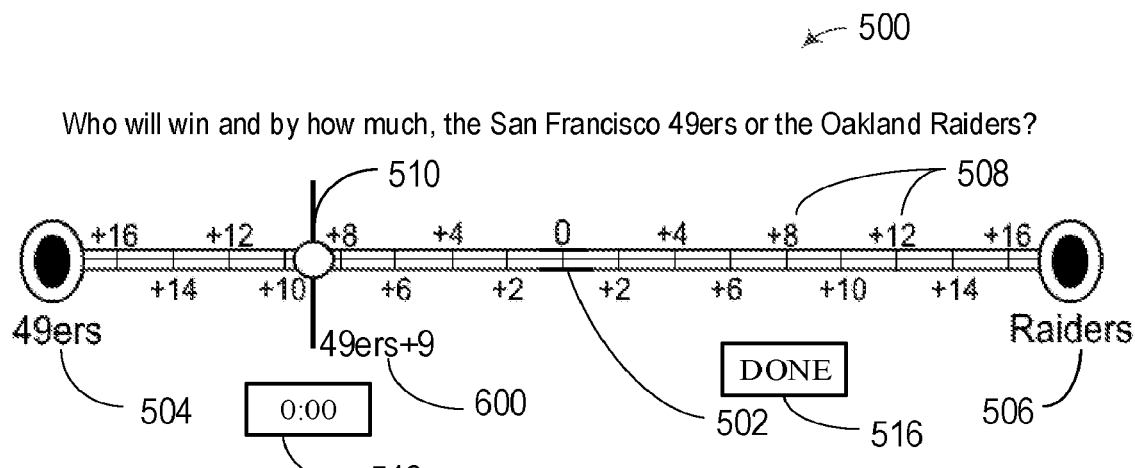
FIG. 6 is an exemplary user interface at a second point in time during the exemplary interactive behavioral polling session in accordance with some embodiments of the present invention.

An example of the dynamic interface 500 at the end of the first time period is shown in FIG. 6. In this example, the user has moved the slider 510 to a location on the left-hand side of the selection line 502, indicating a selection of the 49ers to win by 9 points. In some embodiments, a textual indication 600 of the selection location may be shown. FIG. 6 also shows the countdown timer 512 reading "0:00", thus indicating to the user that the input time period has ended.

The system generally includes the countdown timer 512, so the user feels pressured to act promptly, but still has significant time—for example, 15 seconds counting down in the example above. The user might move the slider 510 quickly during the 15 seconds, or they might adjust and readjust, all of which is captured by the software. The system also generally includes the clickable or pressable "DONE" button (as shown in FIG. 5), indicating (before the time period is up) that the user has finished, allowing them to move on, even if the counter has not yet gotten to zero.

Again, the important thing is that the software tracks behavioral information for the user, not just the final resting position of the slider 510. This behavioral information includes (1) the time delay between the prompt and the user first grabbing the slider and moving it, (2) the speed of the slider, (3) the motion dynamics of the slider—does it go straight to an answer or does it overshoot and come back or does it get adjusted and readjusted during the allotted time period, as the countdown timer ticks down.

In the next perturbation analysis step 406, after the first time period has ended or the user clicks the "done" button 516, the software is then configured to determine (and then present to the user) a perturbation stimulus, which will drive a second round of behavior to be captured in real-time during a second time period. This may be an indicator telling them what an "EXPERT" thinks the answer is to the given prompt. This may be an indicator telling them what an "AI" thinks the answer is to the given prompt. This may be an indicator telling them what a "population" thinks the answer is to the given prompt. The primary goal is psychological—to inform them that a voice of authority and/or credibility has an alternate view to be considered. In many preferred embodiments, the perturbation is fictional. In other embodiments perturbation can be real (based on actual expert or AI or population). The population may be the group of users currently engaged with the behavioral polling method through individual computing devices 100 and the perturbation indicator may be derived based on a statistical mean or median of their initial input values prior to any perturbation.

In some preferred embodiments, the perturbation analysis step 406 includes collecting and processing user dynamic input data from a plurality of users responding to the prompt, each interacting with a computing device connected to the server, such that the perturbation stimulus is generated based at least in part on the data from the plurality of users responding to the prompt. In this way, a statistical mean or median or other statistical aggregation can be used alone or in part when generating the perturbation stimulus.

In some embodiments the perturbation indicator communicated to each of the plurality of computing devices is identical, such that all participants are given the same perturbation. In other embodiments, a distribution of perturbations is calculated and transmitted such that a range of perturbation indicators are communicated to the plurality of computing devices. In some such embodiments the distribution is a normal distribution. In some embodiments, the distribution is a randomized distribution. An inventive aspect of using a distribution is that the population of participants are provided with a range of unique perturbation stimuli and thereby provide a range of responses to said stimuli for analysis and processing.

In some embodiments the perturbation indicator computed and provided to a first group of participants is based on data collected from a second group of participants.

For this particular example embodiment, the perturbation is a fictional perturbation where the system displays a selection and identifies it as an "expert opinion". The perturbation may be randomly selected to be either higher or lower than the user's response, by a random margin. Or, instead of a random margin, a pre-planned distribution of margins across all users may be employed. For example, if 100 people were given this survey, a pre-planned distribution of margins (above or below the user's initial prediction) may be used for the expert perturbation, enabling the system to collect a diverse data set that has a range of desired perturbations. Alternately, a range of perturbations could be given not across all users who are answering this same question, but across each given user, across a set of predictions (for example, across a set of 10 games being predicted).

Figure 7:
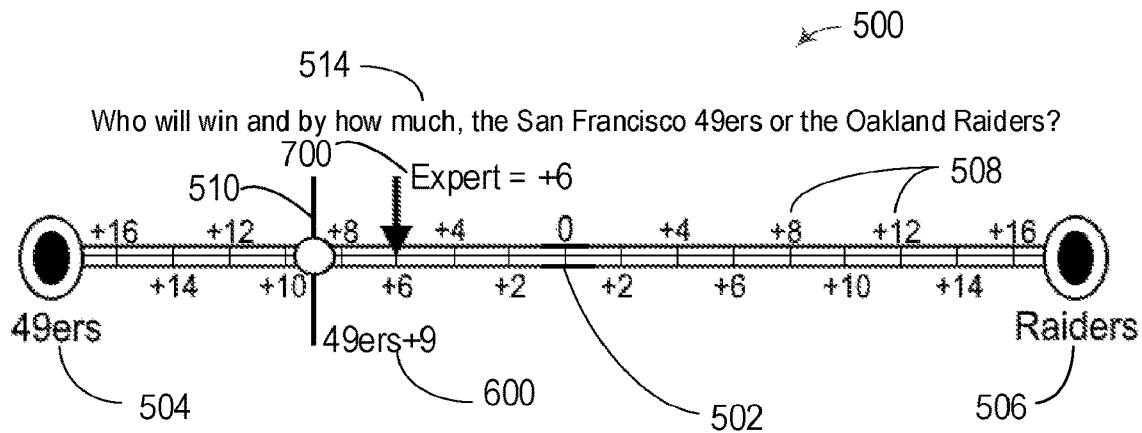
FIG. 7 is an exemplary user interface at a third point in time during the exemplary interactive behavioral polling session in accordance with some embodiments of the present invention.

In the present perturbation stimulus step 408, the perturbation stimulus is shown on the display. An example of the display of the perturbation stimulus is shown in FIG. 7, where a perturbation stimulus 700 is displayed as an arrow located at the +6 point on the left-hand side, with the accompanying text "Experts=+6", indicating to the user an "expert" selection of the 49ers winning by 6 points.

Next, in the provide prompt for updating step 410, The system is configured to prompt the user again, giving them the opportunity during a second time period to update their prediction. In the next second time period step 412, during the second time period the user has the option to adjust the location of the slider 510. In a preferred embodiment, a countdown timer again appears during the second time period, giving the user, for example, 15 seconds to update their prediction. The user could just click the "DONE" button 516 during the second period and not adjust the location of the slider 510. Or the user could adjust the location of the slider 510. During the second time period the software tracks not just the final answer, but again tracks the behavioral dynamics of the process—including (1) the time delay between the prompt and the user grabbing the slider 510 and (2) the speed of the slider motion, and (3) the trajectory of the slider motion, and (4) how quickly the user settles on an updated location. This additional behavioral data, during the second time period in response to the perturbation stimulus, is a further indicator of confidence/conviction in the answer given, especially when processed by machine learning.

Figure 8:
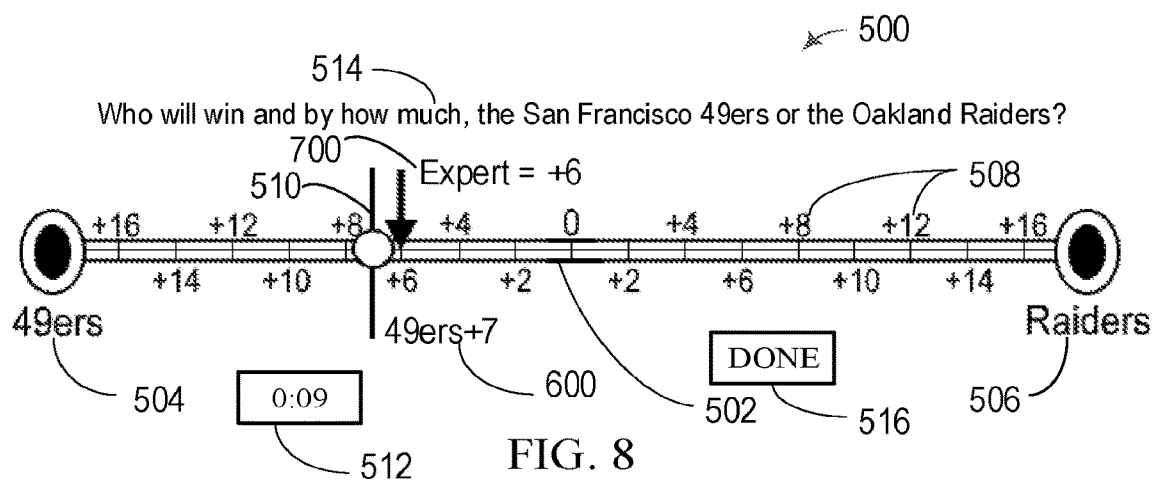
FIG. 8 is an exemplary user interface at a fourth point in time during the exemplary interactive behavioral polling session in accordance with some embodiments of the present invention.

FIG. 8 illustrates user input at a time during the second time period, where the user has adjusted the location of the slider 510 from the previous location of 49ers+9 to an updated location of 49ers+7 (as indicated by the position of the slider 510 and the textual indication 600). The updated position of the slider 510 for this particular user indicates that he or she tempered the personal prediction in response to the perturbation. Some users may not be influenced at all. Again, in many embodiments the prompt is fictional, although the user would not know that, for that allows the software to inject a fixed distribution of perturbation prompts across questions to a single user, and/or across the full population of users. In other embodiments, the prompt is not fictional but computed based on authoritative data, for example from an expert source or a computer model. In a particularly useful embodiment, the prompt is computed in real-time based on the initial data provided by the group of individuals engaging the behavioral polling system on the same question. Thus, the group of users provide input prior to the perturbation. The central server 142 computes a statistical mean or median of the groups input. A perturbation prompt is then generated and displayed based at least in part upon the statistical median or median of the group's input. In some embodiments, statistical variance is applied around the statistical mean or median to ensure that the population gets a range of values as stimuli, rather than all getting the same perturbation stimuli.

After the second time period is ended, in optional calculate scaling factor step 414, the computing device 100 (or the CCS 142, if the data is sent over the network to the CCS 142) calculates a scaling factor based on the data collected during the first and second time periods. This scaling factor could be then used when the user is participating in a real-time collaborative session, as previously described in the related applications.

Figure 9:
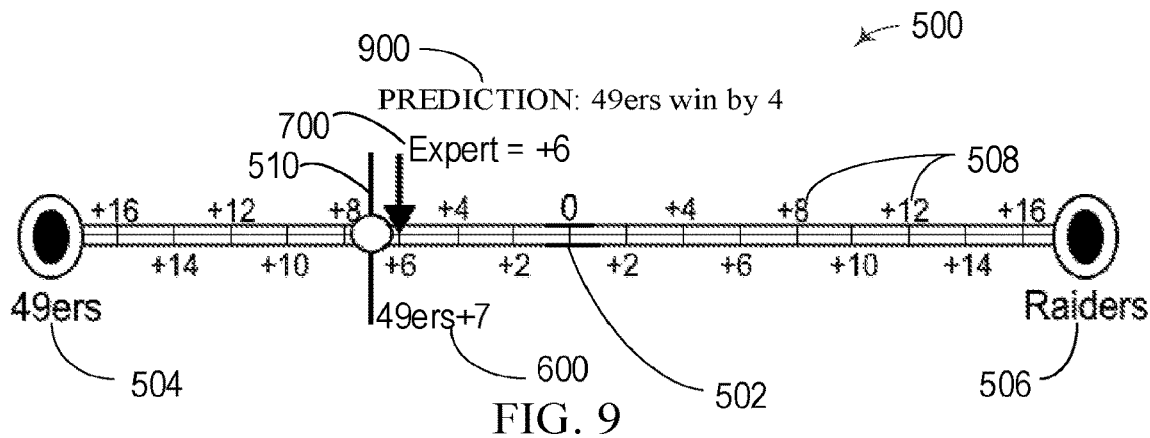
FIG. 9 is an exemplary user interface at a fifth point in time during the exemplary interactive behavioral polling session in accordance with some embodiments of the present invention.

In the next calculate prediction step 416, the CCS 142 receives the data from each user computing device 100 participating in the polling session, and computes a prediction related to the prompt using the behavioral data collected from all users during the time periods, in addition to other data. In the optional final display prediction step 418, the CCS 142 sends an indication of the prediction to each computing device 100, and each computing device 100 displays the prediction on the display, as illustrated in FIG. 9, with a prediction 900 of the 49ers winning by 4 points shown. This forecast is not a simple average of the input reported from the 100 participants, but instead is a weighted aggregation, the weighting based at least in part on the behavioral data collected from participants reflecting their relative confidence and/or conviction in their individual responses.

Behavioral data for each user for each polling session is stored. At the completion of all instances of the dynamic poll, across the set of questions (for example all 15 NFL football games being played during a given week) and across a population (for example, 100 football fans), a detailed and expressive behavioral data set will have been collected and stored in the database of the system (for example, send to and stored in the CCS 142)—indicating not just a set of final predictions across a set of users, but representing the confidence and/or conviction in those predictions, especially when processed by machine learning. In some embodiments the data obtained during the interactive behavioral polling method can be used to identify from a group of users a sub-population of people who are the most effective and/or insightful participants, to be used in a real-time swarming process.

Typical "Wisdom of Crowds" for making a sports prediction collects a set of data points for a particular game, wherein each data point would indicate each user's single forecast for which team will win, and by how much. If there were 100 users predicting the 49ers/Raiders game, the process would generate an average value across the simple data set and produce a mean. The problem is, every user in that group has (a) a different level of confidence and/or conviction in their answer, (b) they are very poor at expressing or even knowing their confidence, and (c) if asked to report their confidence, every individual has a very different internal scale—so confidence can't be averaged with any accuracy. Thus, traditional methods fail because they combine predictions form a population of very different individuals, but those values are not all equivalent in their scales, confidence or accuracy.

Figure 10:
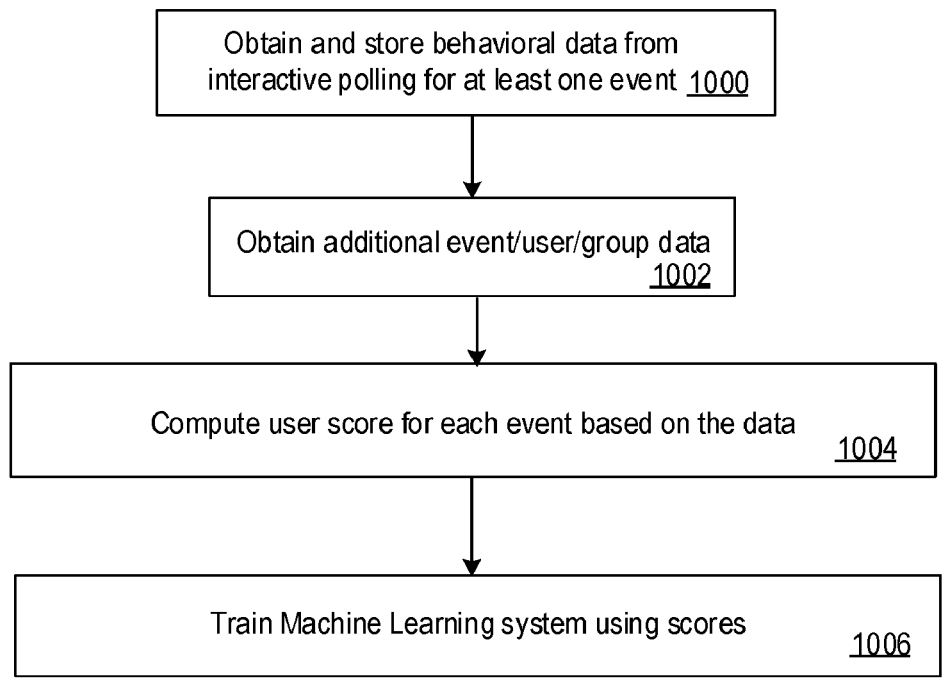
FIG. 10 is a flowchart for training a Machine Learning algorithm using behavioral data in accordance with one embodiment of the present invention.

To solve this problem, the unique behavioral data collected in the steps of FIG. 4 above, combined with unique machine learning techniques, has enabled us to scale (and aggregate) the contributions of each participant in the population based on a more accurate indication of their relative confidence in their personal predictions, and/or the relative accuracy of those predictions. An exemplary flowchart for training a Machine Learning algorithm using the behavioral data is shown in FIG. 10.

In a first obtain and store behavioral data step 1000, the system collects behavioral data using the interactive polling method as previously described. For example, the system collects behavioral data that includes thinking delay time between when the prompt 514 appears on the screen for a given user and that user starts to move the slider 510, in combination with elapsed time taken for the user to settle on an initial answer using the slider 510, the max speed of the slider 510, and the total distance traveled of the slider 510 over time (including overshoots and/or double-backs), along with the user's answer value for the initial prompt phase, and the adjustment amount that the user changed their answer when prompted with a perturbation, as well as the elapsed time taken for the adjustment, the max speed during the adjustment, and the total distance traveled of the slider 510 during the adjustment (including overshoots and/or double-backs).

In the next obtain additional data step 1002, additional event/user/group data is obtained. For example, in some embodiments, the system collects and/or computes, for each user, the amount of time they spent pulling away from the majority sentiment in the population. In addition to the above behavioral data, the system also may also collect and store data regarding how correct each user was in their initial estimate, as well as how correct they were in their final estimate in the face of the perturbance. In some embodiments, the users are required to also engage in a real-time swarm, where how much time the user spends pulling against the swarm (i.e. being defiant to the prevailing sentiment) is tracked.

In some embodiments, users are asked "How much would you bet on this outcome?" as a means of gathering further confidence data. In some such embodiments, the dynamic behavioral data is used to estimate confidence by training on the correlation between the behavioral data and the "How much would you bet on this outcome?" answers. (This is called 'dollar confidence' in our current methods).

In some embodiments, webcam data is collected from users during the interactive period while they are dynamically manipulating the slider input in response to the prompt. This webcam data, which is configured to capture facial expressions, is run through sentiment analysis software (i.e. facial emotion determination and/or sentiment determination and/or engagement determination) to generate and store sentiment, emotion, and/data engagement data from each user. For example, tools like Emotient® and/or EmoVu may be used, or other suitable emotion detection API. Facial emotion, sentiment, and/or engagement data collected during the first time period, and separately collected during the second adjustment time period driven by the perturbation, are stored for users for each question they answer. Facial data is thus a secondary form of behavioral data, indicating confidence and/or conviction of users during their interactive responses. This data can then be used in later steps to (a) optimize predictions of confidence in the answer, and/or (b) optimize predictions of accuracy in the answer.

In the computer user score step 1004, the system computes a user score using an algorithm and the obtained data. In one example, the system computes a skill score for each user. Using a football game as an example, if the true outcome of the game is +4, and the user's initial guess is +9, the user might get an initial accuracy score of: |4−9|=5, where the lower the score, the better, with a perfect score being 0. If their updated score was +8, they will get an updated accuracy score of: |4−8|=4, where the lower the score, the better, with a perfect score being 0. The updated accuracy score is also calculated with consideration as to whether the perturbance was an influencer towards the correct score, or away from the correct score. In one such embodiment, the updated accuracy score could be a function of both the user's initial and final skill scores. As an example, if the user's initial guess is +9, and then after the perturbation gives a final guess of +7, where the true outcome of the game is +4, the skill score may be calculated as: |4−9|+|4−7|=8. These scores act as a measure of the user's skill in prediction overall.

In other embodiments, instead of computing accuracy (i.e. how correct the initial prediction and updated predictions were), the system computes scores for user confidence and/or conviction. Defiance time can used by the current system to compute a defiance score. The defiance score and/or other real-time behavioral data is of unique inventive value because it enables weighting of participants without needing historical performance data regarding the accuracy of prior forecasts.

In the final train machine learning algorithm step 1006, the behavioral data and/or the user scores are used to train a machine learning system. For example, the system can train the machine learning algorithm on user confidence and/or conviction scores. The system can train a machine learning algorithm using the defiance score to estimate the defiance time of each user. With this estimate, we are able to weight new users' contributions to new crowds based on their estimated defiance time, thereby increasing the accuracy of the new crowd.

By training a Machine Learning algorithm on these scores, the system can predict which users are more likely to be most skillful at answering the question (e.g. generating an accurate forecast) and which users are less likely to do so. With this predicted skill level, the software of the system is then able to weight new users' contributions to new crowds (or swarms) based on their behavioral data and the combination of other factors, thereby increasing the accuracy of the new crowd (or swarm).

The dynamic behavioral data obtained can be used in an adaptive outlier analysis, for example as previously described in related application Ser. No. 16/059,698 for ADAPTIVE POPULATION OPTIMIZATION FOR AMPLIFYING THE INTELLIGENCE OF CROWDS AND SWARMS. For example, the behavioral data can be used in combination with other characteristics determined from the survey responses for use in machine learning, including the outlier index for that user, as described in the aforementioned related patent application. The contribution of each user to that statistical average can be weighted by (1−Outlier_Index) for that user. Similarly, when enabling users to participate in a real-time swarm, the User Intent values (as disclosed in the related applications) that are applied in real time, can be scaled by a weighting factor of (1−Outlier_Index) for that user. In this way, users are statistically most likely to provide incorrect insights are either removed from the population and/or have reduced influence on the outcome. What is significant about this method is that it does not use any historical data about the accuracy of participants in prior forecasting events. It enables a fresh pool of participants to be curated into a population that will give amplified accuracy in many cases.

In addition to using the behavioral data disclosed above to make a more accurate crowd prediction, as described above, it is also useful to use the behavioral data to identify from the population, a sub-population of people who are the most effective and/or insightful participants, to be used in a real-time swarming process. The present invention enables the curation of human participants by using dynamic behavioral data in two inventive forms—(I) taking an initial pool of baseline participants and culling that pool down to a final pool of curated participants which are then used for crowd-based or swarm-based intelligence generation, and/or (II) taking a pool of baseline participants and assigning weighting factors to those participants based on their likelihood of giving accurate insights (i.e. giving a higher weight within a swarm to participants who are determined to be more likely to give accurate, correctly-confident insights than participants who are determined to be less likely to give accurate, over- or under-confident insights). In some inventive embodiments, both culling and weighting are used in combination—giving a curated pool that has eliminated the participants who are most likely to be low insight performers, and weighting the remaining members of the pool based on their likelihood of being accurate insight performers.

For example, the behavioral data described above, may be used in some embodiments, in combination with other characteristics determined from the survey responses for use in machine learning, including the OUTLIER INDEX for that user, as described in the aforementioned co-pending patent application Ser. No. 16/059,698.

The contribution of each user to a question in a crowd can be weighted by a machine-learned representation of their confidence and predicted accuracy. Similarly, when enabling users to participate in a real-time swarm, the User Intent values that are applied in real time can be scaled by a weighting factor that is machine-learned from the Outlier index and behavioral data. In this way, users are statistically most likely to provide consistently incorrect insights are either removed from the population and/or have reduced influence on the outcome. What is significant about this method is that it does not use any historical data about the accuracy of participants in prior forecasting events. It enables a fresh pool of participants to be curated into a population that will give amplified accuracy in many cases. (This amplification is based only on analysis of that users responses and behaviors to the current set of questions, which does not require historical accuracy data for that user).

In some embodiments of the present invention, a plurality of values are generated for each participant within the population of participants that reflect that participant's overall character across the set of events being predicted. outlier index is one such multi-event value that characterizes each participant with respect to the other participants within the population across a set of events being predicted. In addition, a confidence INDEX is generated in some embodiments of the present invention as a normalized aggregation of the confidence values provided in conjunction with each prediction within the set of predictions. For example, in the sample set of questions provided above, each prediction includes Confidence Question on a scale of 0% to 100%. For each user, the confidence index is the average confidence the user reports across the full set of predictions, divided by the average confidence across all users across all predictions in the set. This makes the confidence index a normalized confidence value that can be compared across users. In addition, multi-event self-assessment values are also collected at the end of a session, after a participant has provided a full set of predictions.

In some embodiments of the present invention, a plurality of multi-event characterization values are computed during the data collection and analysis process including (1) Outlier Index, (2) Confidence Index, (3) Predicted Self Accuracy, (4) Predicted Group Accuracy, (5) Self-Assessment of Knowledge, (6) Group-Estimation of Knowledge, (7) Behavioral Accuracy Prediction, and (8) Behavioral Confidence Prediction. In such embodiments, additional methods are added to the curation step wherein Machine Learning is used to find a correlation between the multi-event characterization values and the performance of participants when predicting events similar to the set of events.

In such embodiments, a training phase is employed using machine learning techniques such as regression analysis and/or classification analysis employing one or more learning algorithms. The training phrase is employed by first engaging a large group of participants (for example 500 to 1000 participants) who are employed to make predictions across a large set of events (for example, 20 to 40 baseball games). For each of these 500 to 1000 participants, and across the set of 20 to 40 events to be predicted, a set of values are computed including an Outlier Index (OI) and at least one or more of a Confidence Index (CI), a Predicted Self Accuracy (PSA), a Predicted Group Accuracy (PGA), a Self-Assessment of Knowledge (SAK), a Group Estimation of Knowledge (GAK), a Behavioral Accuracy Prediction (BAP), and a Behavioral Confidence Prediction (BCP).

In addition, user performance data is collected after the predicted events have transpired (for example, after the 20 to 40 baseball games have been played). This data is then used to generate a score for each of the large pool of participants, the score being an indication of how many (or what percent) of the predicted events were forecast correctly by each user. This value is preferably computed as a normalized value with respect to the mean score and standard deviation of scores earned across the large pool of participants. This normalized value is referred to as a Normalized Event Prediction Score (NEPS). It should be noted that in some embodiments, instead of discrete event predictions, user predictions can be collected as probability percentages provided by the user to reflect the likelihood of each team winning the game, for example in a Dodgers vs. Padres game, the user could be required to assign percentages such as 78% likelihood the Dodgers win, 22% likelihood the Padres win. In such embodiments, alternate scoring methods may be employed by the software system disclosed here. For example, computing a Brier Score for each user or other similar cost function.

The next step is the training phase wherein the machine learning system is trained (for example, using a regression analysis algorithm or a neural network system) to find a correlation between a plurality of the collected characterization values for a given user (i.e. a plurality of the Outlier Index, the Confidence Index, a Predicted Self Accuracy, a Predicted Group Accuracy, a Self-Assessment of Knowledge, a Group Estimation of Knowledge, a Behavioral Accuracy Prediction, and a Behavioral Confidence Prediction) and the Normalized Event Prediction Score for a given user. This correlation, once derived, can then be used by the inventive methods herein on characterization value data collected from new users (new populations of users) to predict if the users are likely to be a strong performer (i.e. have high normalized Event Prediction Scores). In such embodiments, the machine learning system (for example using multi-variant regression analysis) will provide a certainty metric as to whether or not a user with a particular combination of characterization values (including an Outlier Index) is likely to be a strong or weak performer when making event predictions. In other embodiments, the machine learning system will select a group of participants from the input pool of participants that are predicted to perform well in unison.

Thus, the final step in the Optimization and Machine Learning process is to use the correlation that comes out of the training phase of the machine learning system. Specifically, the trained model is used by providing as input a set of characterization values for each member of a new population of users, and generating as output a statistical profile for each member of the new population of users that predicts the likelihood that each user will be a strong performer based only on their characterization values (not their historical performance). In some embodiments the output is rather a grouping of agents that is predicted to perform optimally. This is a significant value because it enables a new population of participants to be curated into a high performing sub-population even if historical data does not exist for those new participants.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of aggregating polling data from a population of members, with increased accuracy by computing each member's behavioral response to an intervening perturbation stimulus, the method comprising:

displaying, on each of a plurality of computing devices, wherein each computing device is associated with one member of the population and is configured for network communication and is running an interactive polling application, an initial polling prompt and a dynamic user interface enabling a user to select a numerical value from within a displayed range of numerical values in response to a polling prompt;

during a first time period, collecting and storing first time period data from each member of the population via the plurality of computing devices, wherein the first time period data comprises a first numerical value from each member of the population, wherein the first numerical value is selected by each member using the dynamic user interface, wherein a set of first numerical values captured during the first time period consists of the first numerical value from each member of the population;

after the first time period, performing an analysis on the set of first numerical values captured during the first time period;

defining at least one perturbation stimulus based on the analysis, wherein each perturbation stimulus is a numerical value within the range of displayed numerical values of the dynamic user interface;

displaying one of the at least one perturbation stimulus on each computing device, wherein all perturbation stimuli are displayed substantially simultaneously on each of the plurality of computing devices;

displaying an updated polling prompt on each of the plurality of computing devices indicating a user opportunity for additional interaction with the dynamic user interface;

during a second time period, collecting and storing second time period data from each member of the population via the plurality of computing devices, wherein the second time period data comprises a second numerical value from each member of the population, wherein the second numerical value is selected by each member using the dynamic user interface in response to the updated polling prompt and the at least one perturbation stimulus;

computing a confidence value for each member based at least in part on an adjustment amount for that member, wherein the adjustment amount is the change between the first numerical value and the second numerical value for that member;

calculating an aggregated polling result based at least in part on the confidence value computed for each member in combination with at least one of the first numerical value and the second numerical value for each member; and displaying the aggregated polling result on at least one of the plurality of computing devices.

2. The method of claim 1, wherein at least two different perturbation stimuli are defined and displayed to the members of the population, whereby not all members of the population are presented with the same perturbation stimulus.

3. The method of claim 2, wherein the perturbation stimulus displayed to each member includes a numerical value and is based at least in part on a statistical mean or statistical median of the first time period data.

4. The method of claim 3, wherein the numerical value is displayed in graphical form.

5. The method of claim 2, wherein the perturbation stimulus displayed to each member includes a numerical value and wherein statistical variance is applied to the perturbation stimuli to ensure that the members of the population receive a range of numerical values as the perturbation stimulus.

6. The method of claim 1, wherein the dynamic user interface includes a movable slider for selecting the numerical value from the range of numerical values.

7. The method of claim 6, wherein the first period data further comprises motions of the movable slider continually collected and stored over the first time period, whereby the first period collected motion data represents the time-varying position of the movable slider during the first time period.

8. The method of claim 7, wherein the second period data further comprises motions of the movable slider continually collected and stored over the second time period, whereby the second period collected motion data represents the time-varying position of the movable slider during the second time period.

9. The method of claim 8, wherein the computing of the confidence value is additionally based on the time-varying position of the movable slider during at least one of the first and second time period.

* * * * *